(12) United States Patent
Taylor et al.

(10) Patent No.: US 10,948,713 B2
(45) Date of Patent: Mar. 16, 2021

(54) HIGH-PRECISION, HIGH-ACCURACY, SINGLE-HUB LASER SCANNER

(71) Applicant: Vehicle Service Group, LLC, Madison, IN (US)

(72) Inventors: Steve Taylor, Hanover, IN (US); Robin Knoke, White Salmon, WA (US); Merritt Houldson, Salem, OR (US)

(73) Assignee: Vehicle Service Group, LLC, Madison, IN (US)

( * ) Notice: Subject to any disclaimer, the term of this patent is extended or adjusted under 35 U.S.C. 154(b) by 311 days.

(21) Appl. No.: 16/036,527

(22) Filed: Jul. 16, 2018

(65) Prior Publication Data

US 2019/0018234 A1 Jan. 17, 2019

Related U.S. Application Data

(60) Provisional application No. 62/532,712, filed on Jul. 14, 2017.

(51) Int. Cl.
| | |
|---|---|
| *G02B 26/08* | (2006.01) |
| *G02B 26/10* | (2006.01) |
| *G01B 11/24* | (2006.01) |
| *G02B 27/00* | (2006.01) |
| *G02B 27/10* | (2006.01) |
| *G01S 7/497* | (2006.01) |

(Continued)

(52) U.S. Cl.
CPC .......... *G02B 26/108* (2013.01); *G01B 11/002* (2013.01); *G01B 11/2425* (2013.01); *G01B 11/2755* (2013.01); *G01C 15/002* (2013.01); *G01M 17/007* (2013.01); *G01S 7/4813* (2013.01); *G01S 7/497* (2013.01); *G01S 17/42* (2013.01); *G01S 17/46* (2013.01); *G02B 26/0883* (2013.01); *G02B 26/10* (2013.01); *G02B 26/123* (2013.01); *G02B 27/0012* (2013.01); *G02B 27/1073* (2013.01); *G02B 27/126* (2013.01)

(58) Field of Classification Search
CPC .. G02B 26/108; G02B 27/126; G02B 26/123; G02B 26/10; G02B 27/0012; G02B 26/0883; G02B 27/1073; G01B 11/2755; G01B 11/2425; G01B 11/002; G01S 17/42; G01S 17/46; G01S 7/4813; G01S 7/497; G01C 15/002; G01M 17/007
USPC ....................................................... 359/201.2
See application file for complete search history.

(56) References Cited

U.S. PATENT DOCUMENTS

| | | |
|---|---|---|
| 8,381,409 B2 | 2/2013 | Knoke et al. |
| 9,905,992 B1 * | 2/2018 | Welford ................. G01S 7/484 |

* cited by examiner

*Primary Examiner* — Euncha P Cherry
(74) *Attorney, Agent, or Firm* — Frost Brown Todd LLC

(57) ABSTRACT

A laser scanner determines the direction and distance of one or more targets by emitting two substantially parallel beams and receiving respective return beams. Components for handling the received beams are affixed to a monolithic block to ensure fixed relative placement. The direction of the target is determined using an optical encoder to reduce the timing window for interpolation to a fraction of the time it takes for the scanner to make a full revolution. A PLL trained by recent segment timing further improves accuracy and precision. A detection algorithm adapts detection thresholds for the different signatures of return signals depending on the distance to the target. Distance calculations are also adjusted for thermal expansion of the scanner components by including a temperature-variant thermometer output signal in the distance calculation algorithm.

20 Claims, 36 Drawing Sheets

(51) Int. Cl.
*G02B 27/12* (2006.01)
*G02B 26/12* (2006.01)
*G01B 11/275* (2006.01)
*G01S 17/42* (2006.01)
*G01C 15/00* (2006.01)
*G01S 17/46* (2006.01)
*G01B 11/00* (2006.01)
*G01M 17/007* (2006.01)
*G01S 7/481* (2006.01)

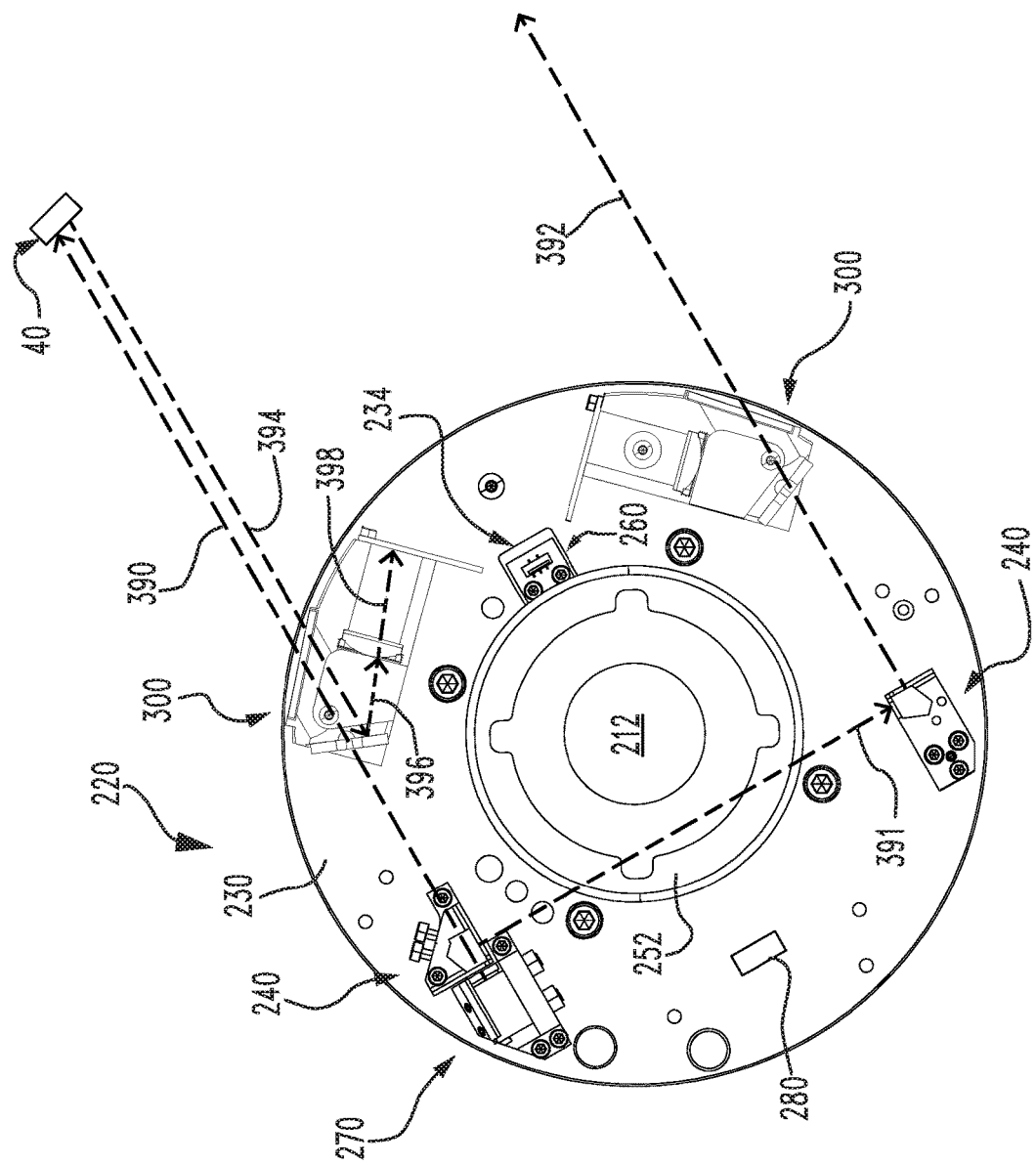

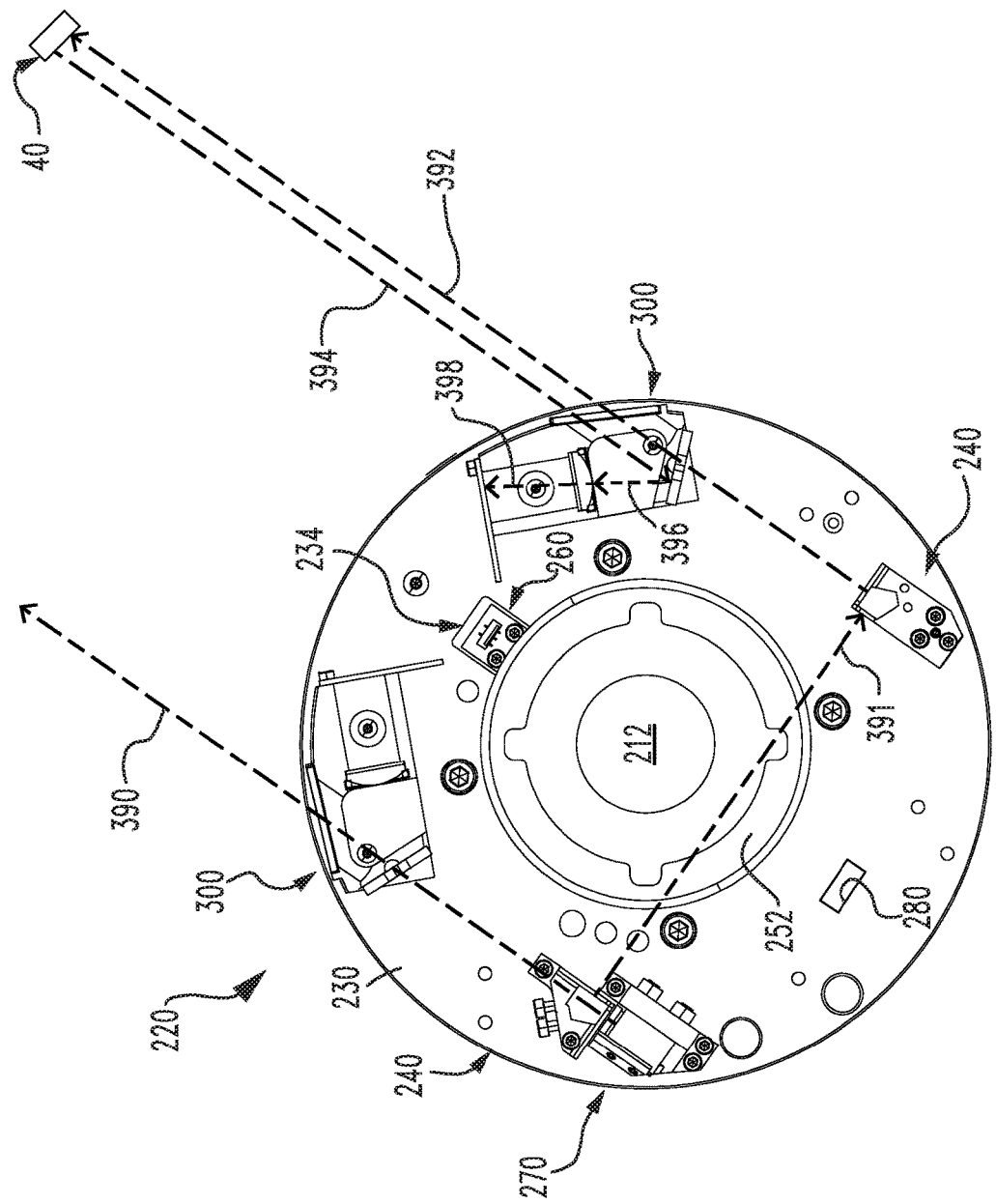

HIGH-PRECISION, HIGH-ACCURACY, SINGLE-HUB LASER SCANNER

PRIORITY

This application claims priority to U.S. Provisional Patent App. No. 62/532,712, entitled "High-Precision, High-Accuracy, Single-Hub Laser Scanner," filed Jul. 14, 2017, the disclosure of which is incorporated by reference herein.

BACKGROUND

Many vehicles have a frame that acts as a structural foundation. As the structural foundation, a vehicle frame may support various vehicle components such as the engine, the body, and the powertrain. Vehicle frames may be formed out of metals, such as steel, and are typically designed to withstand large amounts of stress. However, some frames are also designed with intentional crumple zones to help protect passengers. Crumple zones may operate to deform during a collision to absorb a portion of an impact. Additionally, there are a wide variety of vehicle frames available, having different shapes, sizes, components, etc.

In some instances, such as a collision, a frame of a vehicle may deform from its intended shape. Deformation of a vehicle frame may have adverse consequences, such as misalignment of vehicle components, increased wear on vehicle components, or reduced structural integrity. Sometimes when a vehicle frame is deformed, it may be bent back into its intended shape. However, it may be difficult to determine whether a deformed vehicle frame is properly bent back into its intended shape.

Currently, some frame measuring systems are used which may attach to selected portions of a vehicle frame in order to map the selected portions of the vehicle frame relative to each other. An operator may use the mapped selected portions in order to determine whether a vehicle frame is properly aligned within specified tolerances of its intended shape. However, measuring errors may develop while mapping selected portions of the vehicle frame due to various factors. Measuring errors may prevent an accurate mapping of the selected portions of the vehicle frame and may be so great that the scanning system may indicate a frame is properly aligned when it is still deformed. Measuring errors may be so great that the scanning system may indicate a frame in not properly aligned when the frame is properly aligned.

While various kinds of frame measuring systems, methods, and associated components have been made and used, it is believed that no one prior to the inventor(s) has made or used the invention described in the appended claims.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements, and in which:

FIG. 10B is a cross-sectional top view of the flywheel assembly of FIG. 7 rotated to a second position where the laser assembly of FIG. 9 is activated with a first outward beam reflecting off the coded reflective target of FIG. 1, taken along line 9-9 of FIG. 8;

FIG. 10C is a cross-sectional top view of the flywheel assembly of FIG. 7 rotated to a third position where the laser assembly of FIG. 9 is activated with a second outward beam reflecting off the coded reflective target of FIG. 1, taken along line 9-9 of FIG. 8.

Figure 1:
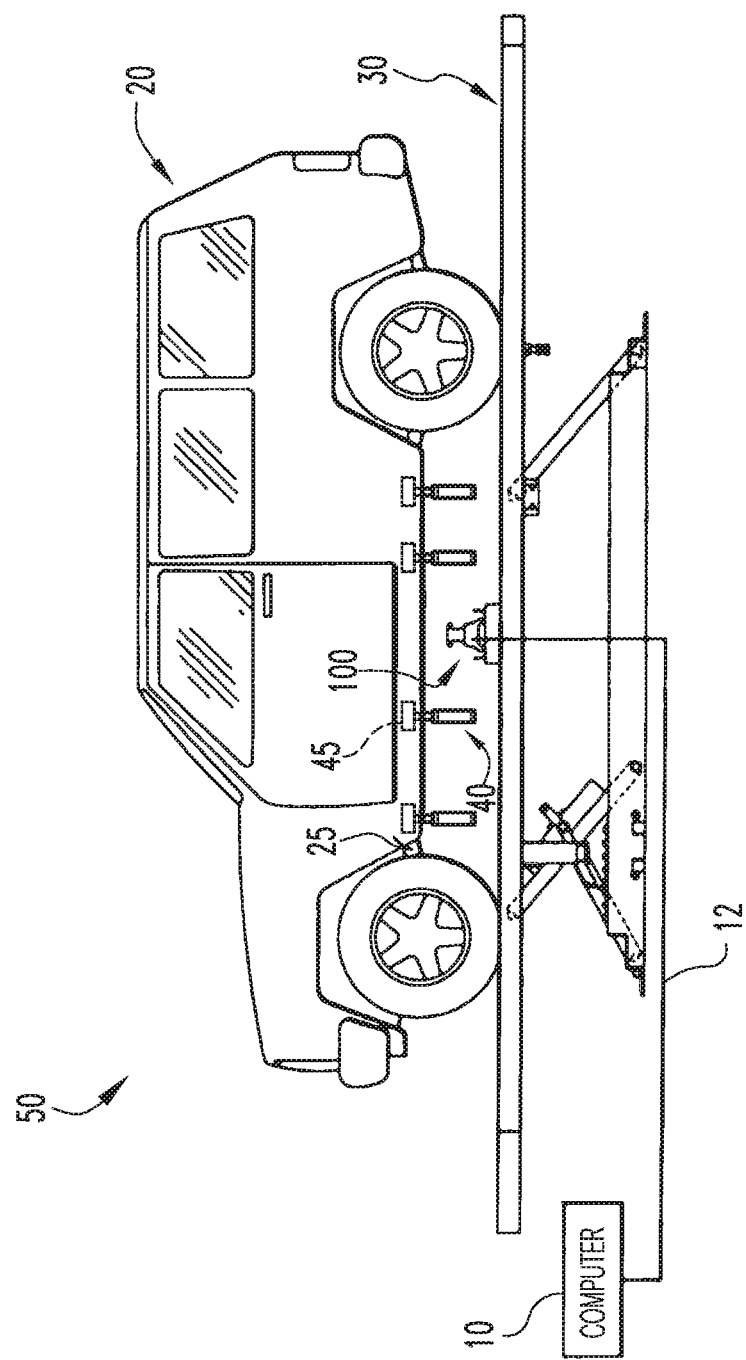
FIG. 1 is a side elevational view of a vehicle having coded reflective targets suspended from predetermined locations on the vehicle, and with a scanning assembly below the vehicle and in an orientation for scanning the coded reflective targets.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

I. Overview of Exemplary Measuring System

FIG. 1 shows an exemplary measuring system (50). Measuring system (50) is shown in FIG. 1 in an exemplary environment including a vehicle lift assembly (30) elevating a vehicle (20). Vehicle (20) includes a frame assembly (25).

Measuring system (50) includes a scanning assembly (100), a computer (10), and a plurality of coded reflective targets (40) attached to selected points of frame assembly (25) via frame attachments features (45). Suitable components of scanning assembly (100) are in communication with computer (10) via a cable (12). Frame attachment features (45) are configured to attach to selected points on frame assembly (25) in such a way to properly orient coded reflective targets (40) relative to scanning assembly (100). Any suitable types of frame attachment features (45) and coded reflective targets (40) may be used as would be apparent to one having ordinary skill in the art in view of the teachings herein.

Scanning assembly (100) is positioned to vertically align with coded reflective targets (40). While in the current example, scanning assembly (100) is supported by vehicle lift assembly (30), scanning assembly (100) may be supported by any other suitable mechanism as would be apparent to one having ordinary skill in the art in view of the teachings herein. For example, scanning assembly (100) may rest on its own adjustable support table.

As will be described in greater detail below, scanning assembly (100) is configured to rotate while emitting light, such as laser light, so that the light reflects off coded reflective targets (40) and back toward scanning assembly (100). Scanning assembly (100) is configured to detect when reflected light from targets (40) is directed back toward scanning assembly (100). Therefore, scanning assembly (100) may be located at a position with no visual obstructions between scanning assembly (100) and all coded reflective targets (40).

Scanning assembly (100) may send any suitable information to computer (10) so that computer (10) may determine the rotational position or rotational displacement of scanning assembly (100) when scanning assembly (100) detects the reflected light from targets (40). By applying geometric principles, computer (10) may use this information to determine where coded reflective targets (40) are located in three-dimensional space relative to scanning assembly (100) and each other. Alternatively, scanning assembly (100) may itself contain the processing resources required to determine the location of each coded reflective target (40), then scanning assembly (100) may send this data to a user display.

Figure 2A:
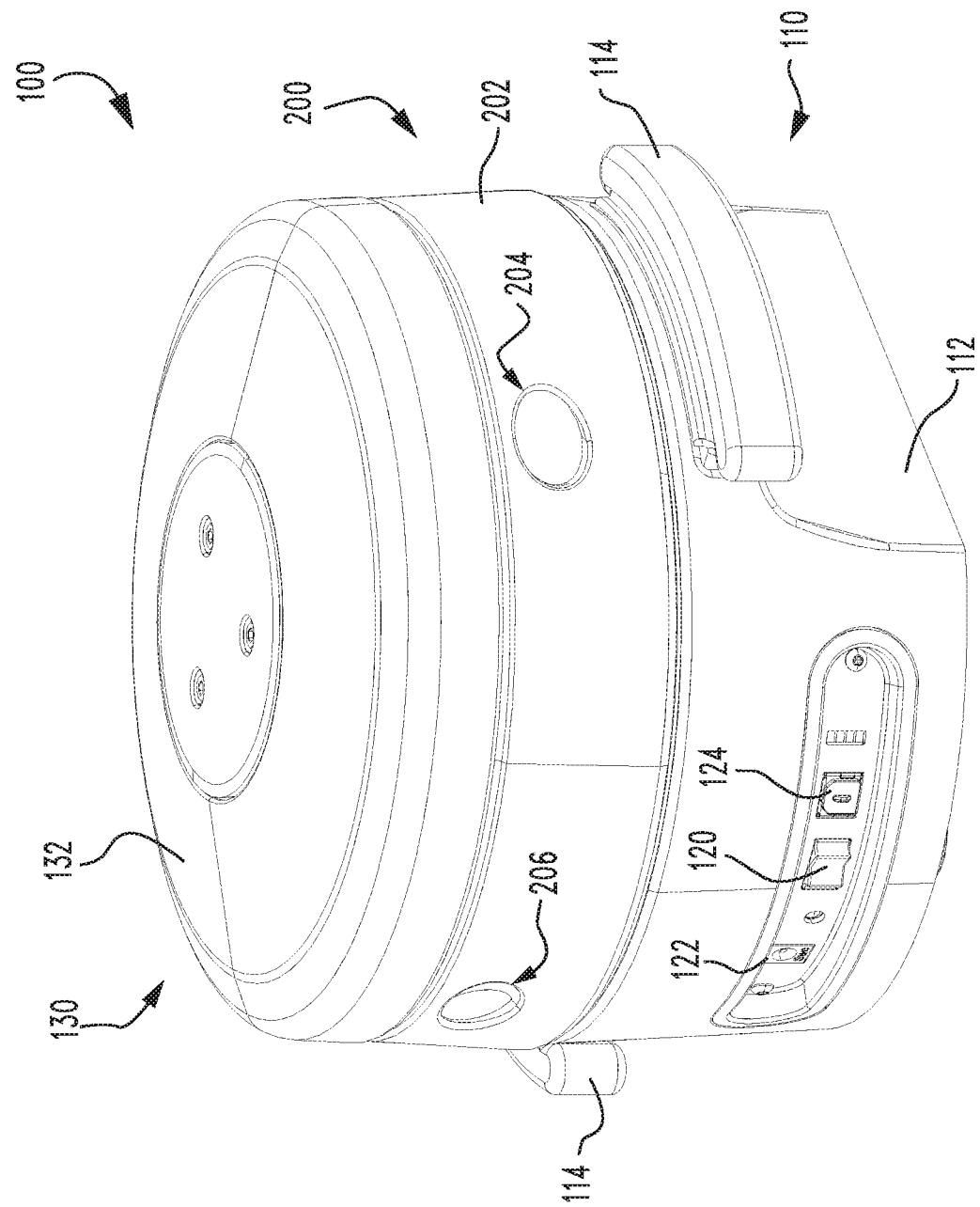
FIG. 2A is a perspective view of the scanning assembly of FIG. 1, where a revolving assembly is in a first rotational position.
Figure 2B:
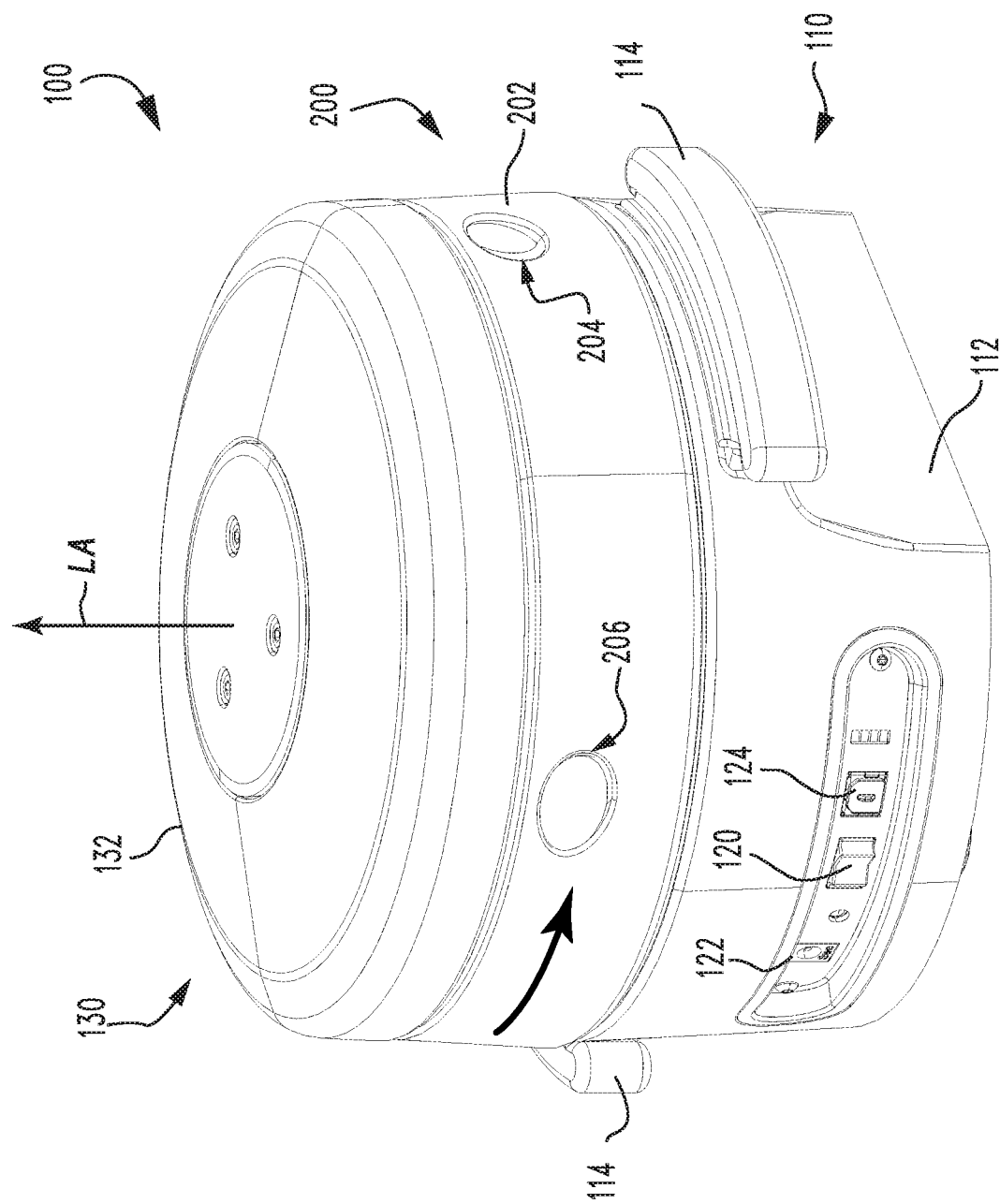
FIG. 2B is a perspective view of the scanning assembly of FIG. 1, where the revolving assembly of FIG. 2A is rotated to a second rotational position.
Figure 3:
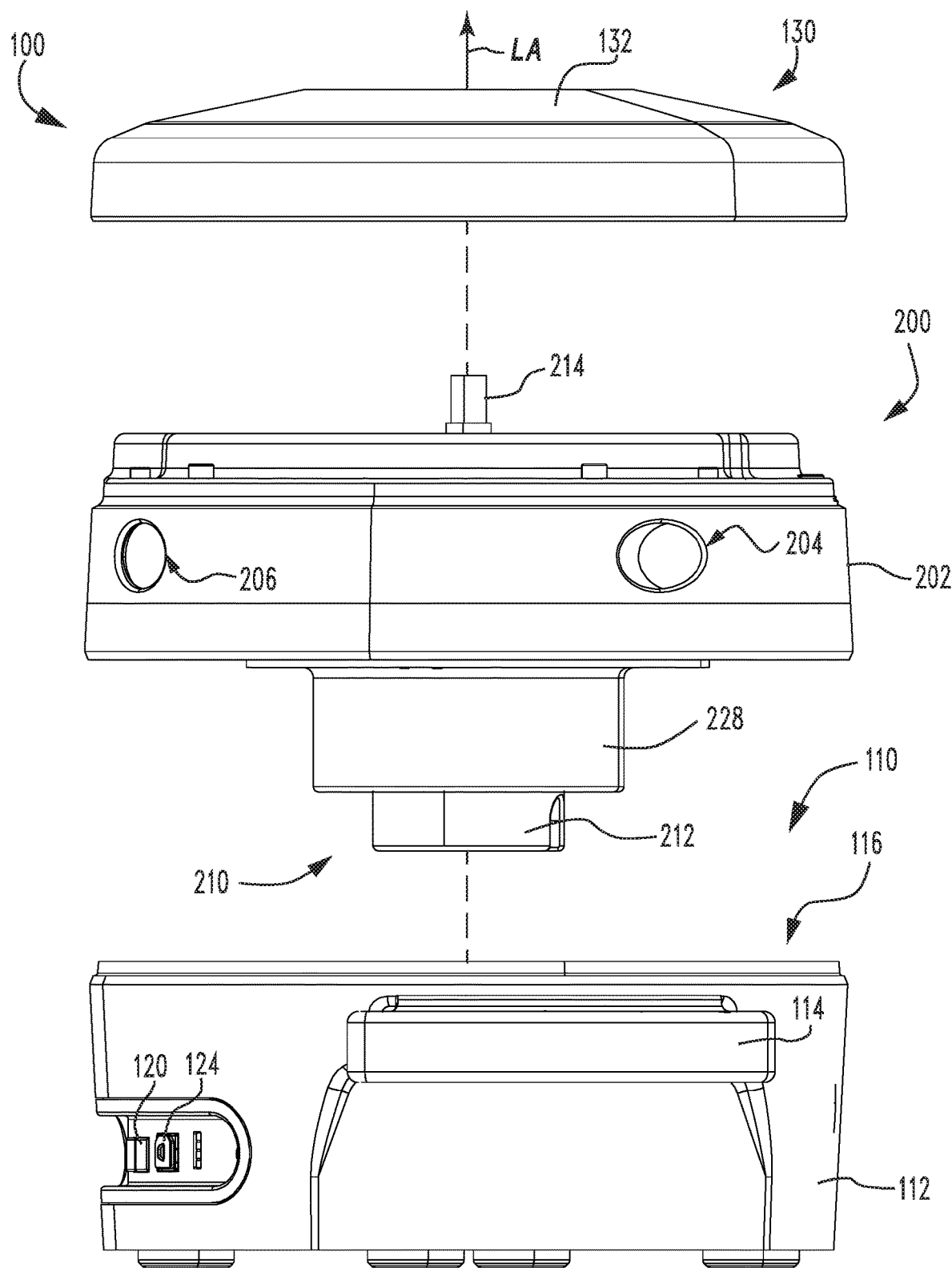
FIG. 3 is an exploded side elevational view of the scanning assembly of FIG. 1.

FIGS. 2A-3 show exemplary scanning assembly (100). Scanning assembly (100) includes a base assembly (110), a top assembly (130), and a revolving assembly (200). As seen between FIGS. 2A-2B, selected portions of revolving assembly (200) are configured to rotate relative to base assembly (110) and a cap (132) of top assembly (130) about a longitudinal axis (LA). Revolving assembly (200) may rotate about longitudinal axis (LA) with as close as possible to a constant rotational velocity, though variations in that rotational velocity will occur as will be understood by those skilled the art.

Base assembly (110) includes a body (112), handles (114) extending from body (112), a power switch (120), a power port (122), and a communication port (124). As best seen in FIG. 3, body (112) of base assembly (110) defines an opening (116) configured to house and couple with portions of revolving assembly (200). Handles (114) are configured to allow an operator to grasp and place scanning assembly (100) in a desired location. Power switch (120) is operable to activate scanning assembly (100) to operate as described above and as will be described in greater detail below. Therefore, power switch (120) may activate scanning assembly (100) to rotate revolving assembly (200), emit light from revolving assembly (200), detect reflected light from targets (40), and track rotational position and/or displacement of revolving assembly (200). Power switch (120) may also activate any other functions of scanning assembly (100) requiring electrical power. Alternatively or additionally, activation of power switch (120) energizes a supervisory/control system through which the operator may separately activate revolving assembly (200), laser (272), measurement electronics, and other components as will occur to those skilled in the art in view of this disclosure.

Power port (122) is configured to connect with an electrical power source to charge or activate scanning assembly (100). Scanning assembly (100) may house a battery such that when a power port (122) in connected to an electrical power source, the battery begins to charge. The battery may be configured to power all the electrical requirements of scanning assembly (100) even when it is not directly connected to an electrical power source. In other embodiments, scanning assembly (100) does not contain a battery such that scanning assembly (100) may only operate when power port (122) is connected to an electrical power source.

Communication port (124) is configured to couple with communication cable (12) to establish communication between computer (10) and scanning assembly (100). While in the current example, communication port (124) and communication cable (12) provide communication between computer (10), any other suitable form of communication between scanning assembly (100) and computer (10) may be used as would be apparent to one having ordinary skill in the art in view of the teachings herein. For example, communication port (124) may alternatively or additionally comprise a wireless interface configured to provide wireless communication between scanning assembly (100) and computer (10), effectively eliminating the need for communication cable (12). Alternatively, scanning assembly (100) may be able to communicate with computer (10) via both wireless and wired communication, giving an operator choice over which method to use.

Figure 4:
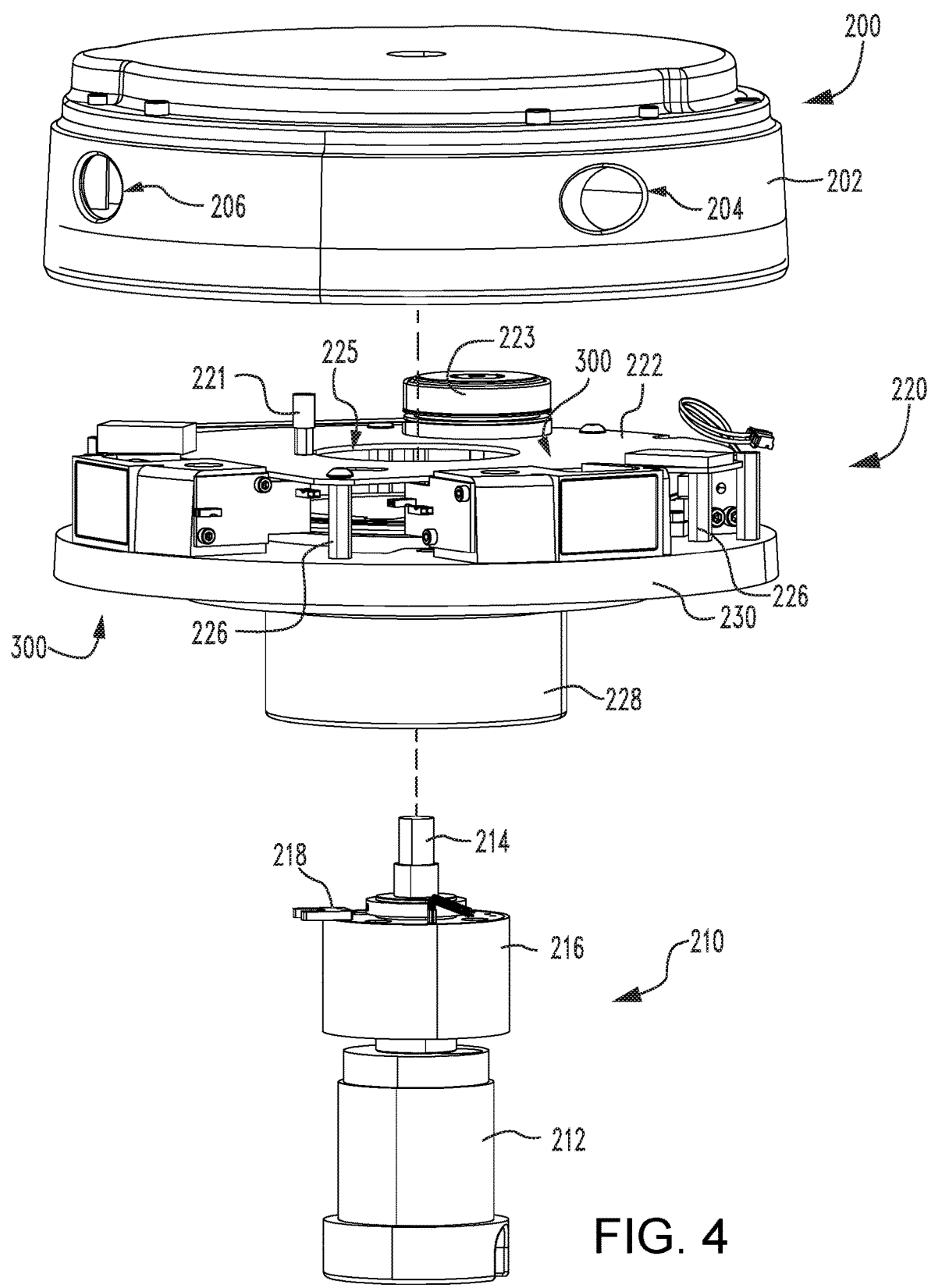
FIG. 4 is an exploded perspective view of the revolving assembly of FIG. 2A.

As best seen in FIG. 4, revolving assembly (200) includes a drive assembly (210), a flywheel assembly (220), and a casing (202). Casing (202) defines a first aperture (204) and a second aperture (206). Casing (202) is fixed to and covers a top portion of flywheel assembly (220) such that first aperture (204) and second aperture (206) align with optical block assemblies (300). As will be described in greater detail below, optical block assemblies (300) are configured to allow light to pass through optical block assembly (300) such that scanning assembly (100) may emit light toward targets (40), and such that scanning assembly (100) may receive and detect reflected light from targets (40). First aperture (204) and second aperture (206) are aligned with optical block assemblies (300) to allow light to pass out of and into selected portions of optical block assemblies (300) as well as casing (202).

Figure 5A:
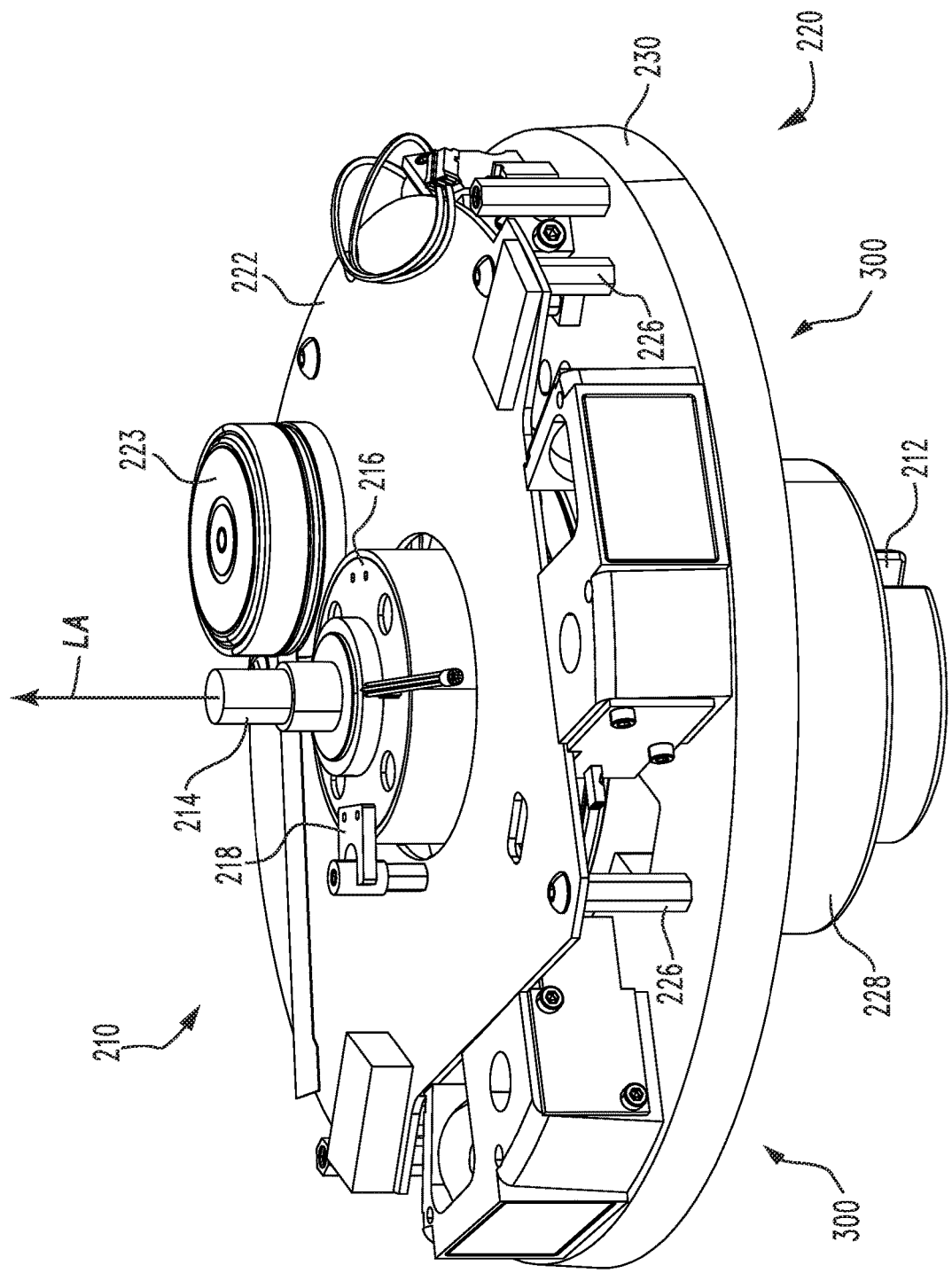
FIG. 5A is a perspective view of the revolving assembly of FIG. 2A in the first rotational position, with a casing removed for purposes of clarity.
Figure 5B:
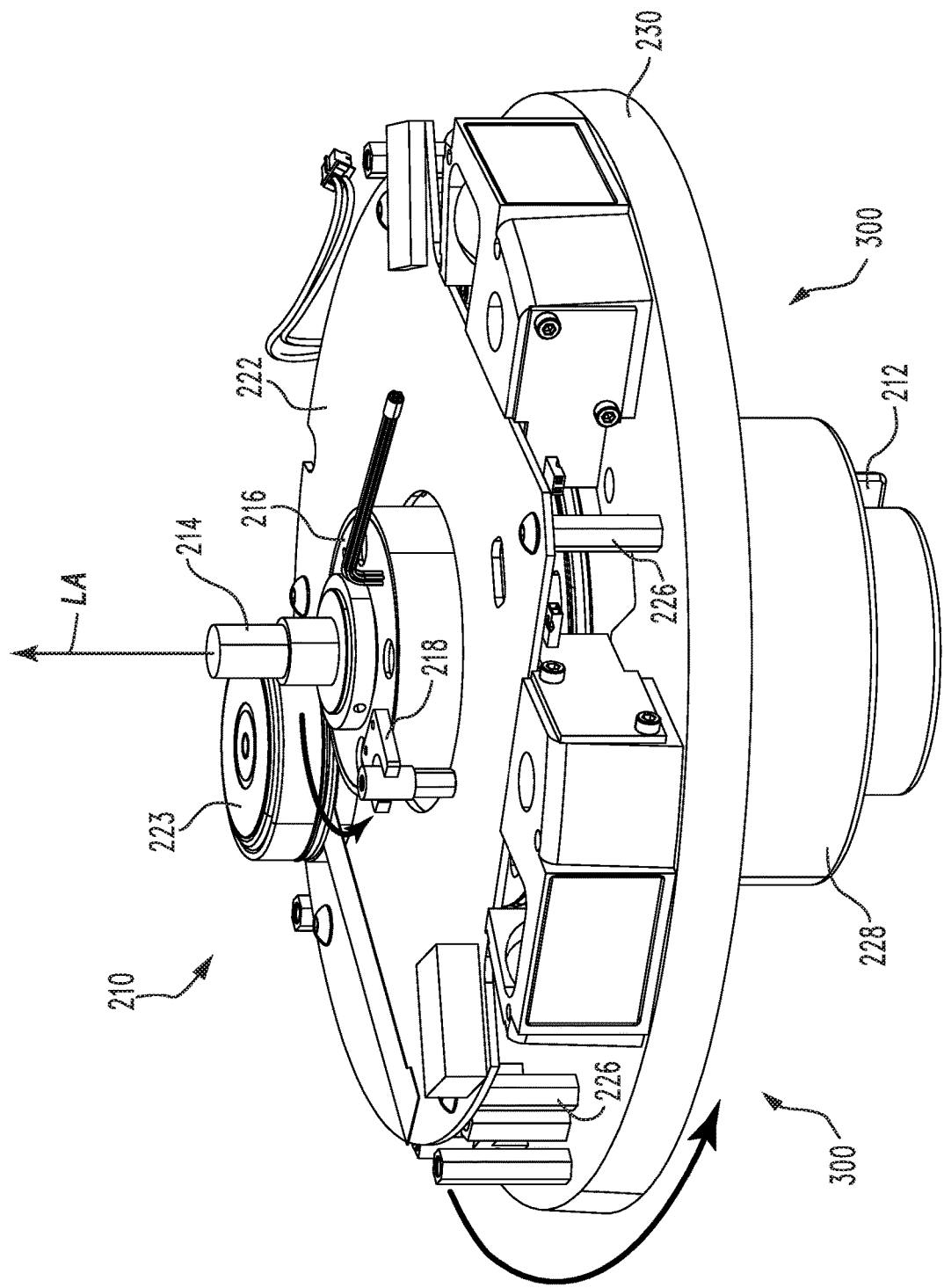
FIG. 5B is a perspective view of the revolving assembly of FIG. 2A in the second rotational position, with a casing removed for purposes of clarity.
Figure 6:
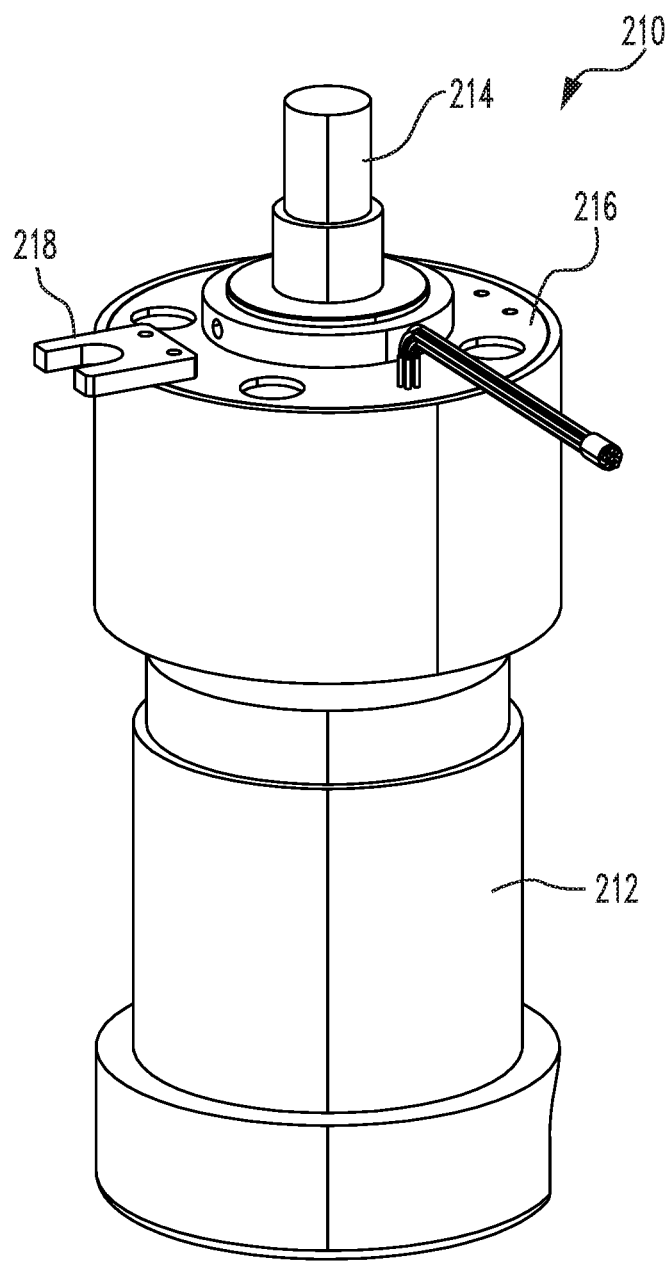
FIG. 6 is a perspective view of a drive assembly of the revolving assembly of FIG. 2A.

As best seen in FIG. 6, drive assembly (210) includes a cylindrical base (212), extending upward into a vertical shaft (214), a slip ring (216) rotatably coupled to cylindrical base (212) and/or vertical shaft (214), and a coupling arm (218) extending radially outward from slip ring assembly (216). Cylindrical base (212) is coupled with base assembly (110) while vertical shaft (214) is coupled with cap (132) of top assembly (130). Cylindrical base (212) and vertical shaft (214) are mechanically grounded with base assembly (110) such that neither cylindrical base (212) or vertical shaft (214) may rotate relative to base assembly (110). When scanning assembly (100) is activated, slip ring assembly (216) is configured to rotate around longitudinal axis (LA) defined by vertical shaft (214). As best seen in FIGS. 5A-5B, coupling arm (218) is connected to slip ring assembly (216) such that rotation of flywheel assembly (230) around longitudinal axis (LA) rotates coupling arm (218) around longitudinal axis (LA). Slip ring assembly (216) is configured to send electrical power and communication signals back and forth from the rotating circuit board (222) to the stationary circuit board located in the body (112).

Figure 7:
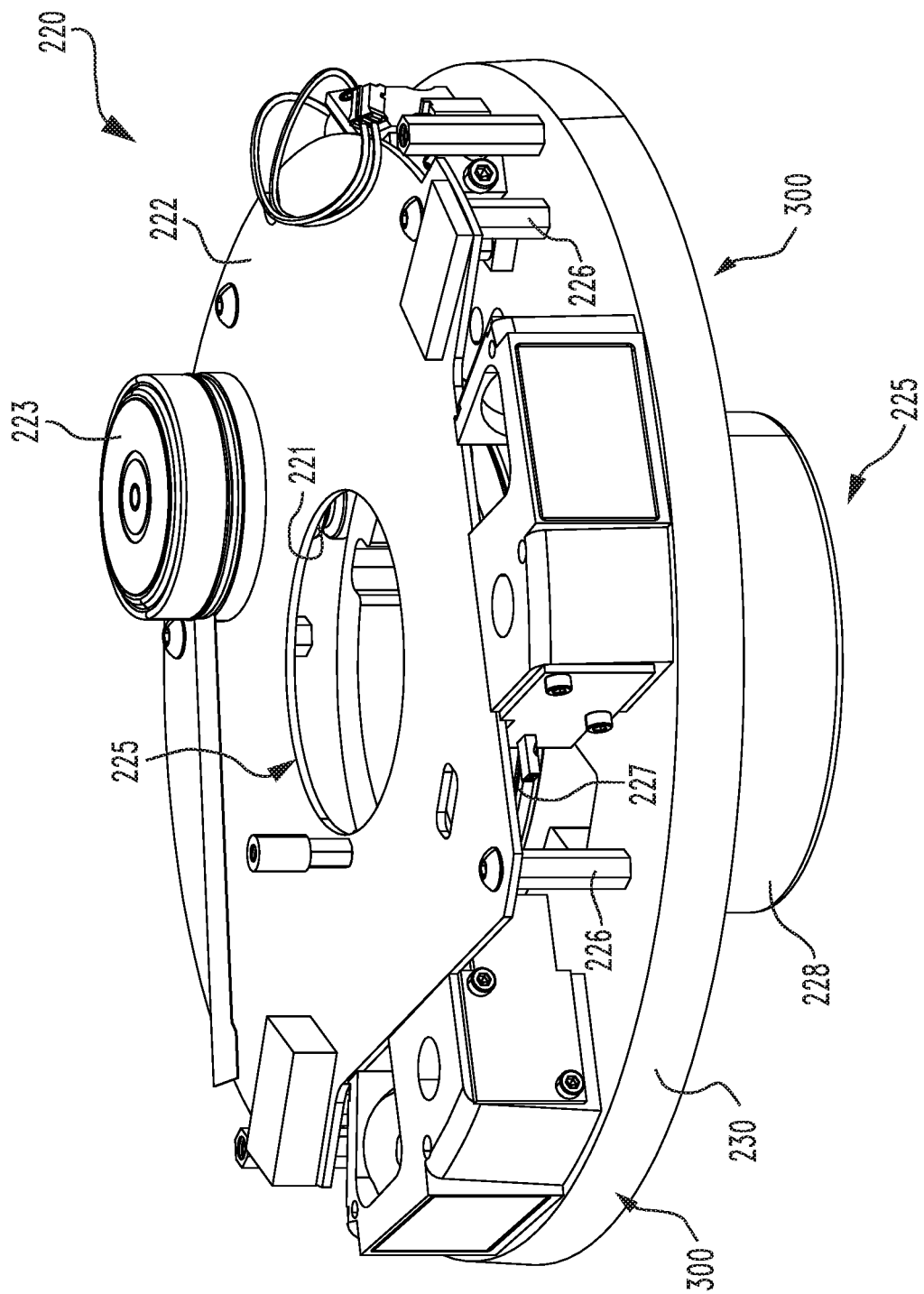
FIG. 7 is a perspective view of a flywheel assembly of the revolving assembly of FIG. 2A.

As best seen in FIG. 7, flywheel assembly (220) includes a rotating circuit board (222) fixed to a flywheel base (230) via a plurality of connecting columns (226). Flywheel assembly (220) defines a central opening (225) configured to receive a portion of drive assembly (210). Drive assembly (210) also includes a motor (223) mounted to the rotating circuit board (222). A motor pulley (221) is mounted to the end of the motor shaft. The motor pulley (221) is connected to the stationary pulley (227) by a belt, such that when the motor (223) rotates the motor pulley (221), the flywheel base (230) is rotated around the longitudinal axis (LA). While motor (223) is connected to rotating circuit board (222) in the current example, motor (223) may be coupled with any other suitable portion of scanning assembly (100) as would be apparent to one having ordinary skill in the art in view of the teachings herein. Additionally, any other suitable components may be used in order to rotationally drive flywheel assembly (220) as would be apparent to one having ordinary skill in the art in view of the teachings herein.

Additionally, flywheel assembly (220) includes a rotating collar (228) fixed with flywheel base (230). Rotating collar (228) is rotatably coupled with cylindrical base (212) of drive assembly (210) such that rotating collar (228) may rotate around longitudinal axis (LA) while remaining vertically supported by cylindrical base (212). Because flywheel base (230) is fixed to rotating collar (228), flywheel base (230) is also rotatably coupled with cylindrical base (212). Rotating collar (228) may be coupled with cylindrical base (212) by any suitable means that would be apparent to one having ordinary skill in the art in view of the teachings herein. For example, a plurality of ball bearings may rotatably couple rotating collar (228) with cylindrical base (212).

Figure 8:
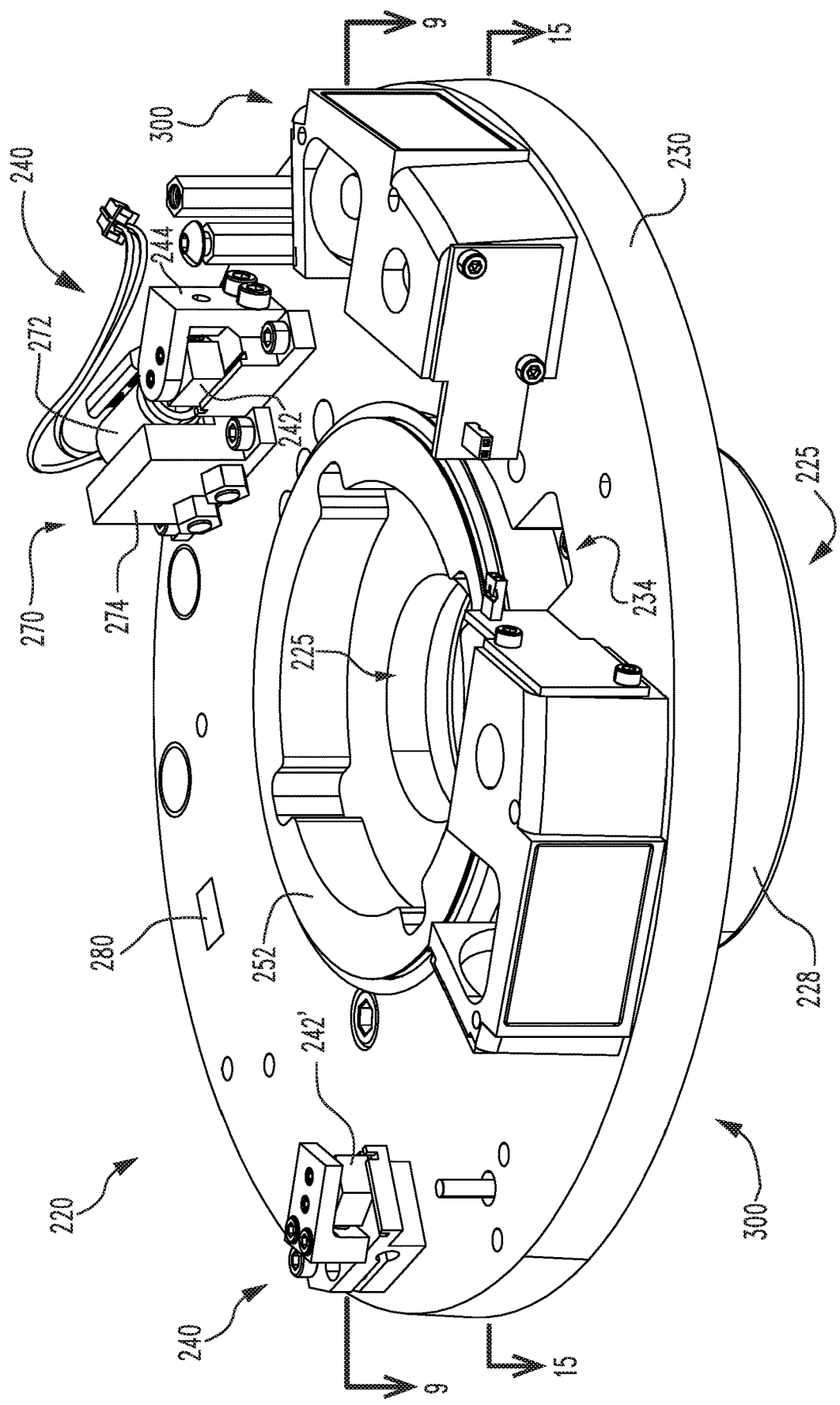
FIG. 8 is another perspective view of the flywheel assembly of FIG. 7, with selected components removed for clarity.
Figure 11:
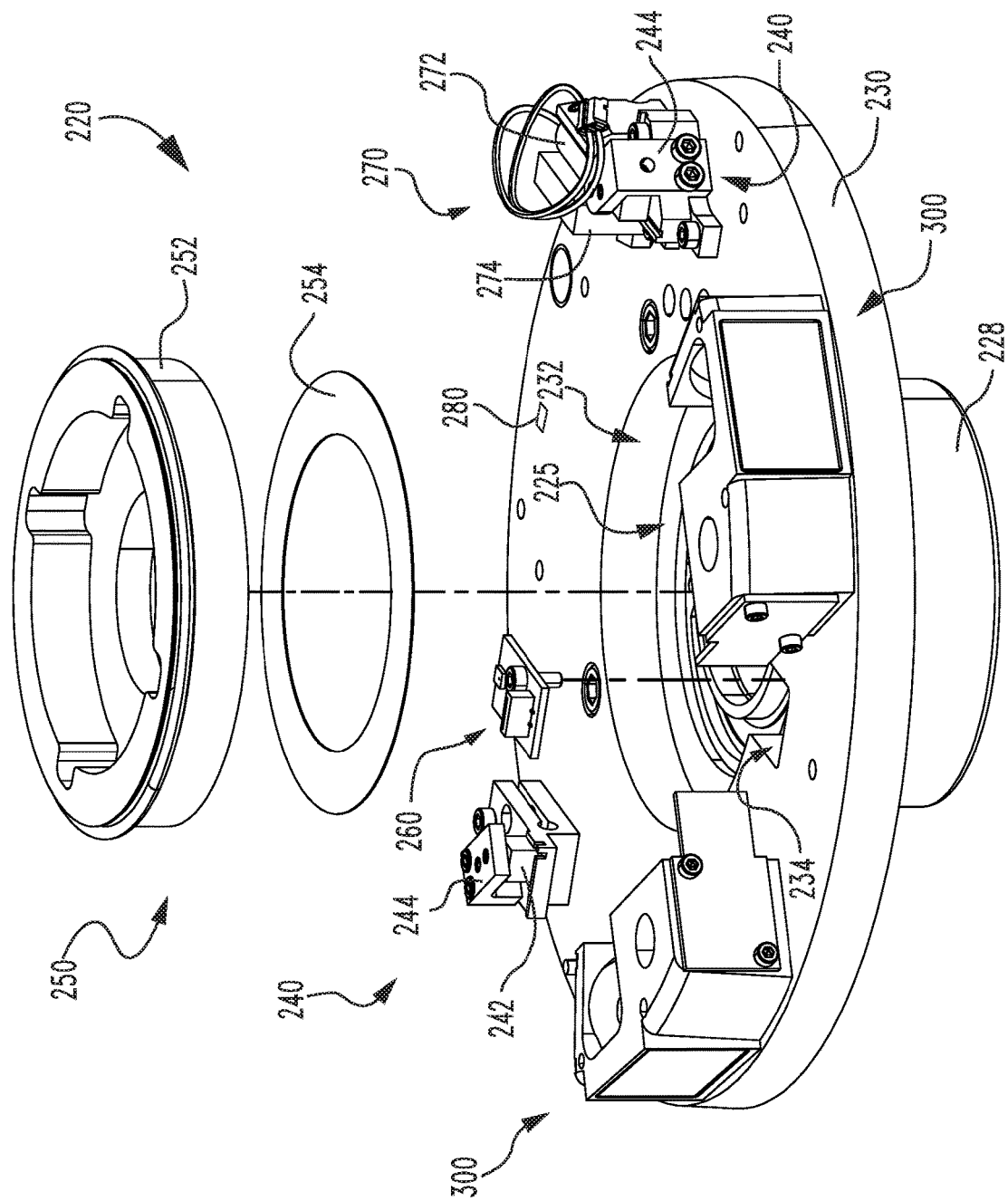
FIG. 11 is an exploded perspective view of the flywheel assembly of FIG. 7, with selected components removed for purposes of clarity.
Figure 12:
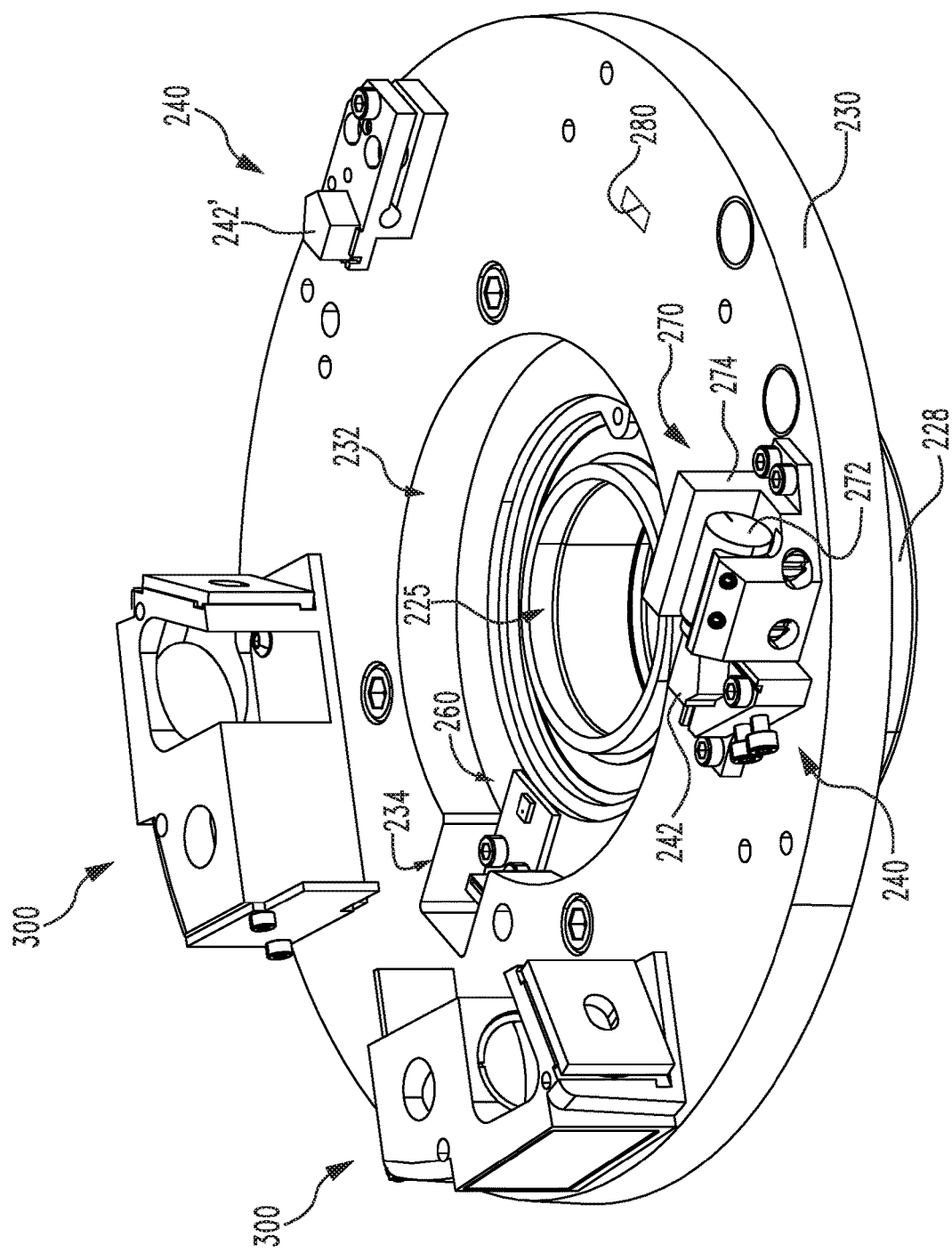
FIG. 12 is a perspective view of the flywheel assembly of FIG. 7, with selected components removed for purposes of clarity.
Figure 13:
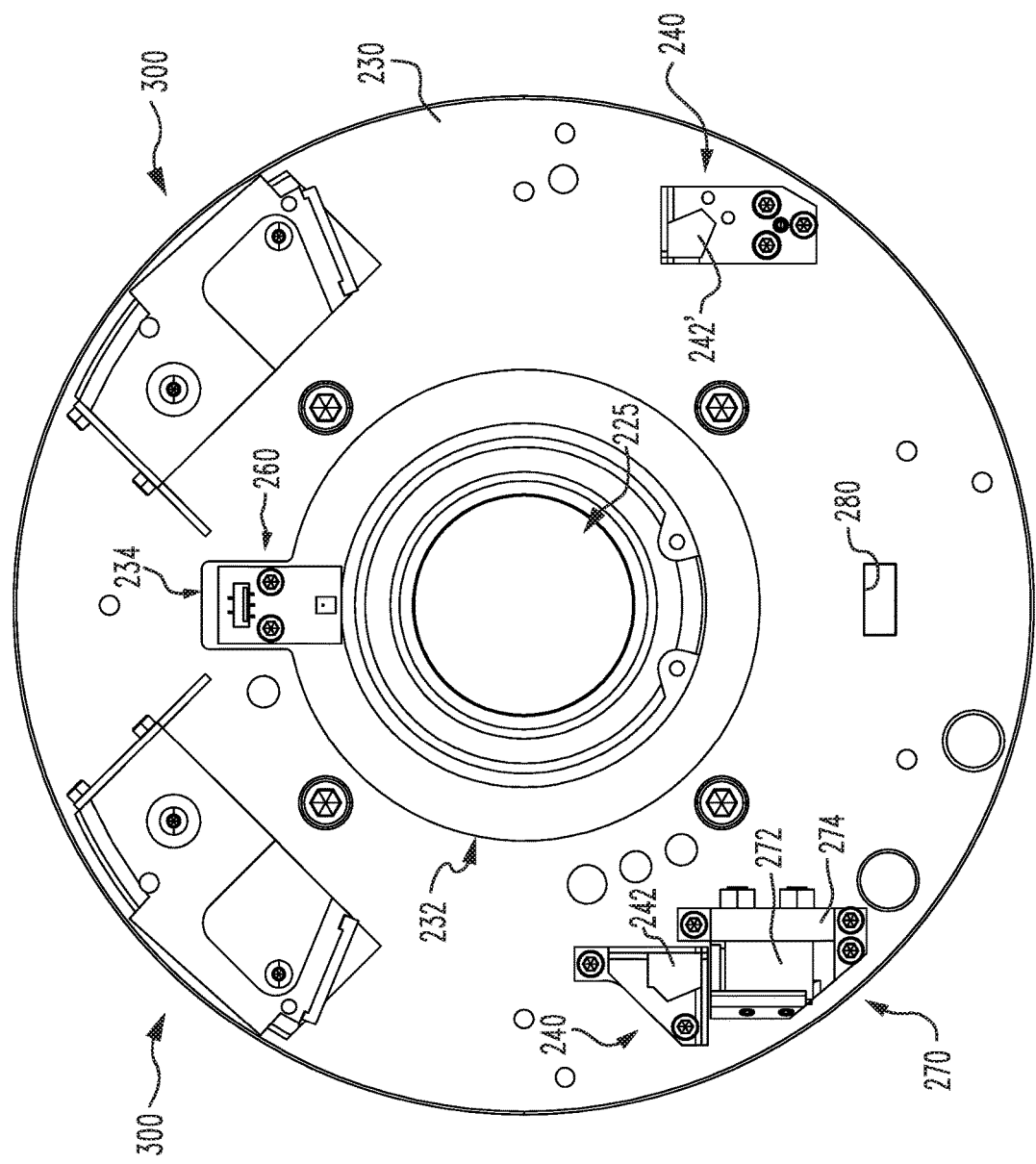
FIG. 13 is a top plan view of the flywheel assembly of FIG. 7, with selected components removed for purposes of clarity.
Figure 14:
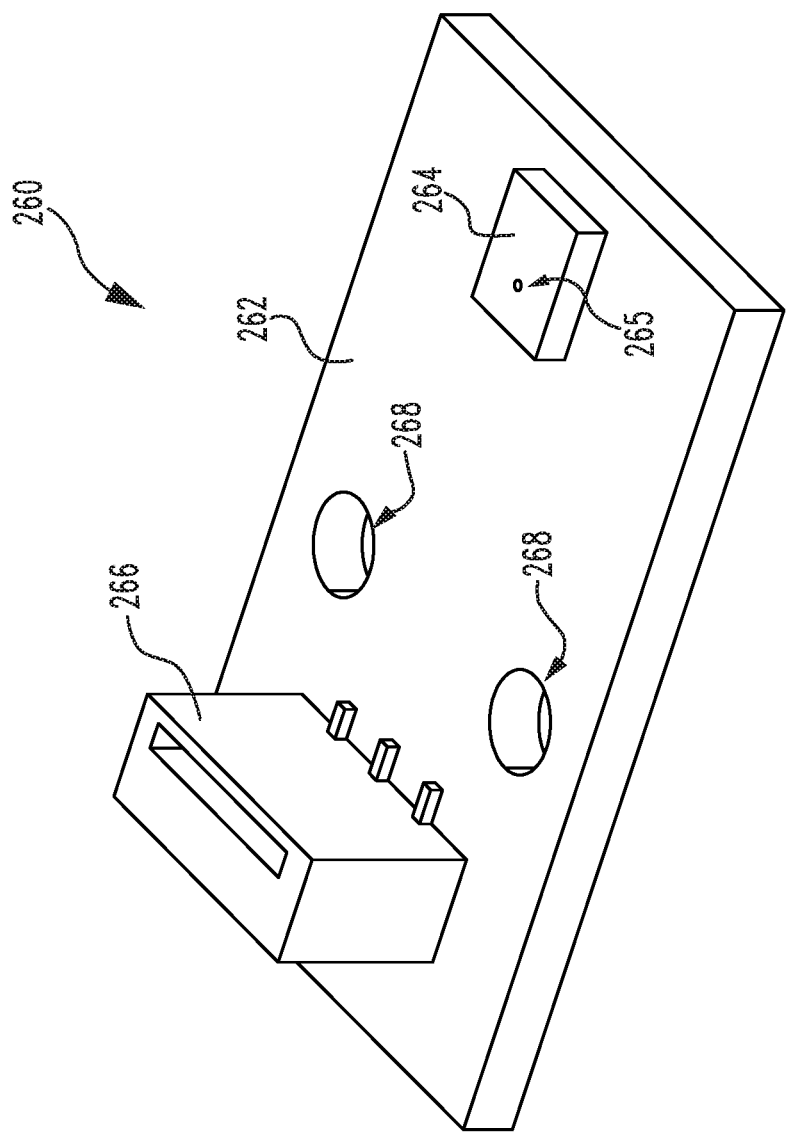
FIG. 14 is a perspective view of an encoder assembly of a rotational displacement measuring assembly of the flywheel assembly of FIG. 7.
Figure 15:
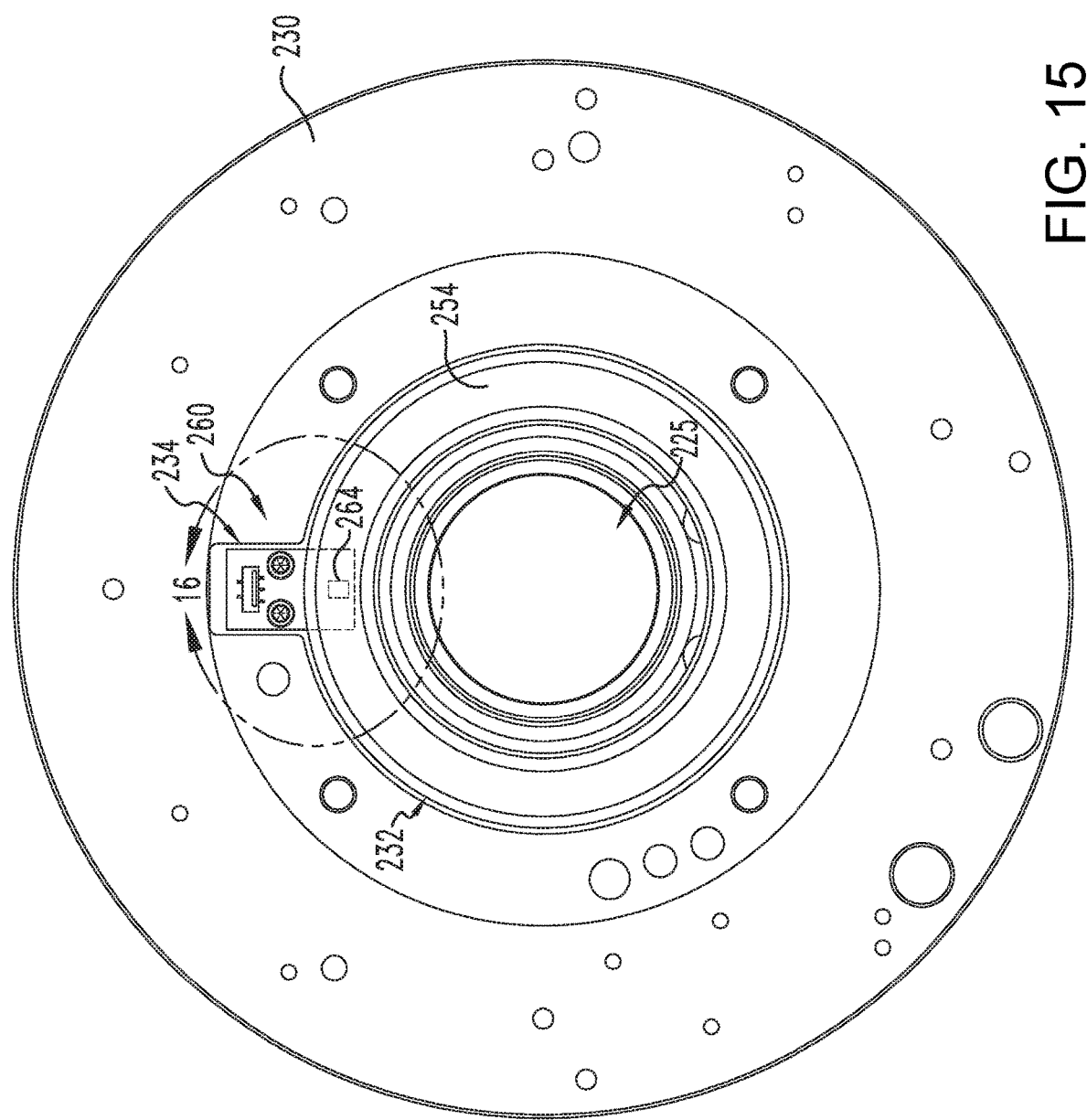
FIG. 15 is a cross-sectional plan view of the flywheel assembly of FIG. 7, taken along line 15-15 of FIG. 8.

FIGS. 8 and 11 show flywheel assembly (220), omitting rotating circuit board (222) for purposes of clarity. As described above, flywheel assembly (220) include a flywheel base (230) that is rotatable around longitudinal axis (LA). A laser assembly (270), two pentaprism assemblies (240), two optical block assemblies (300), and a temperature sensor (280) are attached to the top of flywheel base (230). Therefore, as flywheel base (230) rotates around longitudinal axis (LA) as described above, laser assembly (270), pentaprism assemblies (240), optical block assemblies (300), and temperature sensor (280) also rotate around longitudinal axis (LA).

Figure 9:
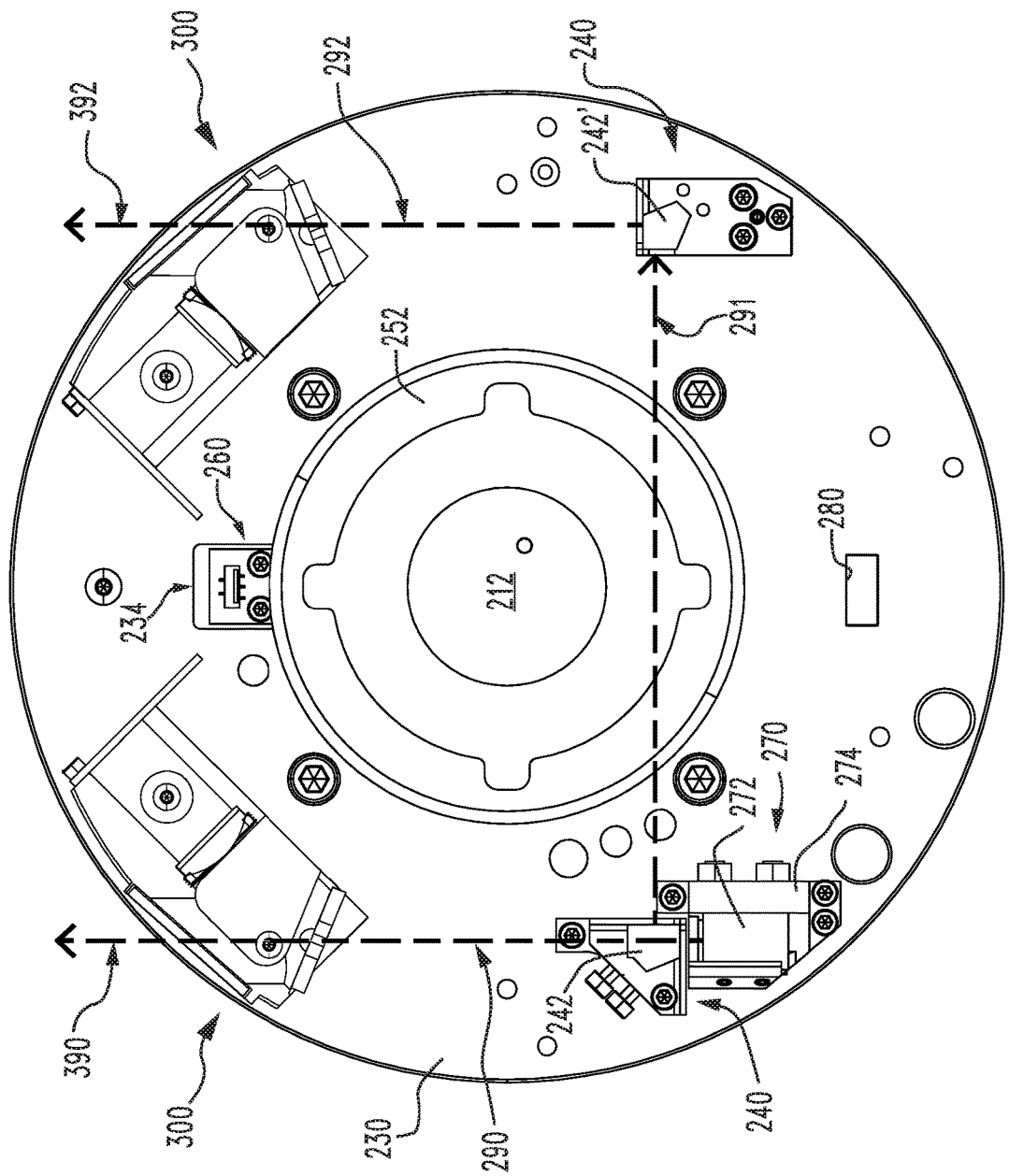
FIG. 9 is a cross-sectional top view of the flywheel assembly of FIG. 7 having a laser assembly activated, taken along line 9-9 of FIG. 8.

Laser assembly (270) includes a laser (272) fixed to flywheel base (230) via a laser mount (274). Each pentaprism assembly (240) includes a pentaprism (242, 242') fixed to flywheel base (230) via a prism mount (244). As can be seen in FIG. 9, laser (272) is effectively adjacent to beamsplitter pentaprism (242) and laterally displaced from the second pentaprism (242'). When laser (272) is activated, it fires a first outward beam (290) through the beamsplitter pentaprism (242) and through a first optical block assembly (300). The beamsplitter pentaprism (242) splits the laser into a split beam (291) directed toward the second pentaprism (242'). The second pentaprism (242') then directs split beam (291) into second outward beam (292), which travels through the second optical block assembly (300). First outward beam (290) and second outward beam (292) travel out of revolving assembly (200) through first and second apertures (204, 206) of casing (202). As a result, laser assembly (270) and pentaprism assemblies (240) altogether produce two outward beams (390, 392) that are substantially parallel to each other and are spaced apart a known distance between the two pentaprisms (242, 242'). Since laser (272), pentaprisms (242, 242'), and optical block assemblies (300) are all fixed to flywheel base (230), as flywheel base (230) rotates about longitudinal axis (LA), first and second output beams (390, 392) also rotate about longitudinal axis (LA).

In the current example, pentaprisms (242, 242') are used. However, any other suitable beam-splitting device may be used as would be apparent to one having ordinary skill in the art in view of the teachings herein. For example, prisms with a cross-sectional shape of a rhombus, rhomboid, or parallelogram may be adapted as described, for example, in U.S. Pat. No. 8,381,409.

Figure 10A:
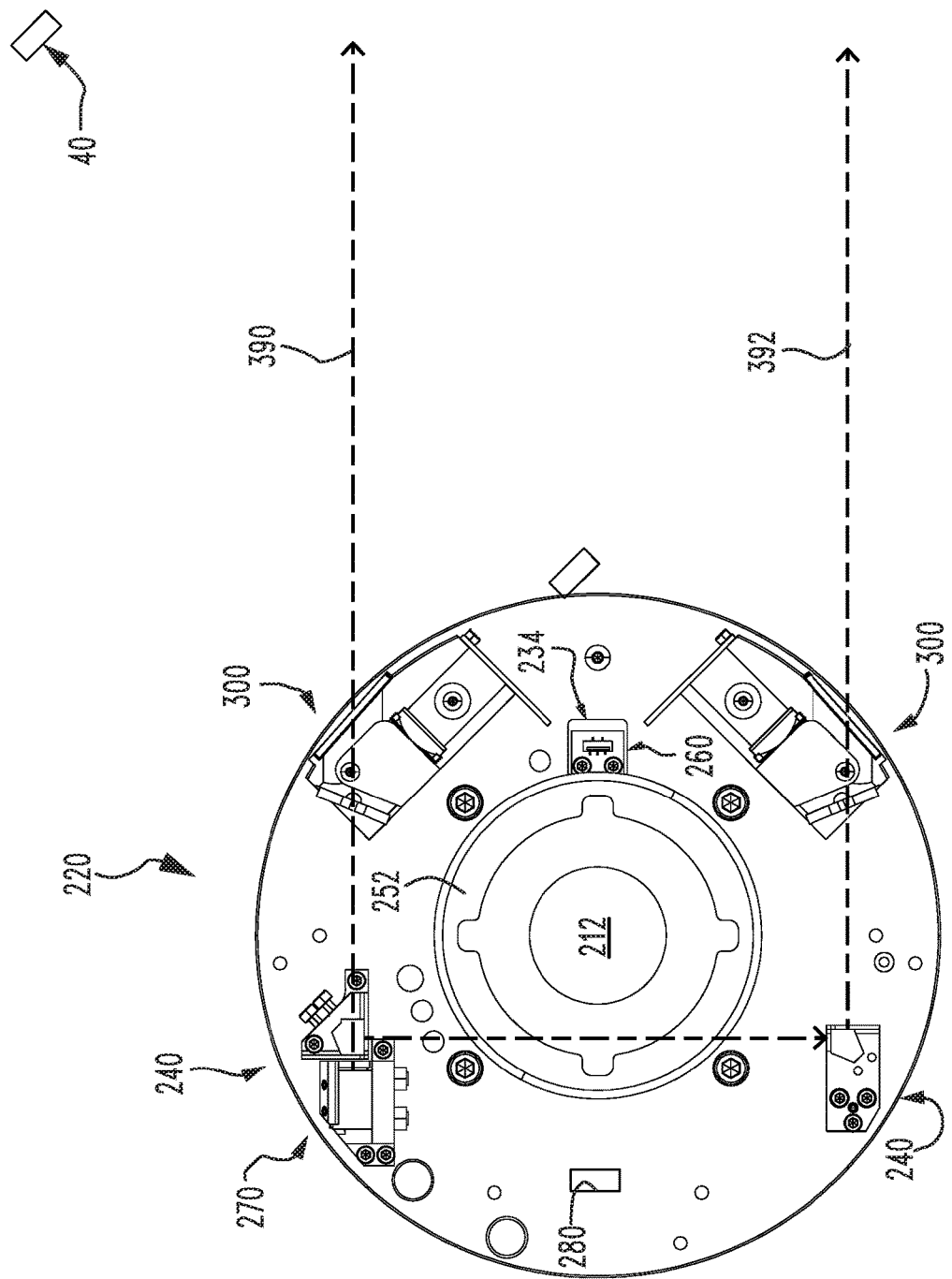
FIG. 10A is a cross-sectional top view of the flywheel assembly of FIG. 7 rotated to a first position where a laser assembly of FIG. 9 is activated with no outward beam reflecting off the coded reflective target of FIG. 1, taken along line 9-9 of FIG. 8.

FIGS. 10A-10C show an exemplary use of scanning assembly (100) utilizing laser assembly (270), pentaprism assemblies (240), and optical block assemblies (300) as described above. Scanning assembly (100) is properly positioned as described above such that scanning assembly (100) is vertically aligned with targets (40). Target (40) is attached to frame (25) of vehicle (20) via frame attachment feature (45) such that target (40) is properly oriented relative to scanning assembly (100). While one target (40) is shown in FIGS. 10A-10C, it should be understood that a plurality of targets (40) may be effectively oriented and positioned on predetermined positions of vehicle frame (25).

FIG. 10A shows flywheel assembly (220) in an initial rotational position once scanning assembly (100) has been activated via power switch (120). Therefore, laser (272) is activated such that pentaprism assemblies (240) produce first outward beam (390) and second outward beam (392) as described above. Additionally, flywheel assembly (220) begins to rotate around longitudinal axis (LA) such that outward beams (390, 392) also rotate around longitudinal axis (LA) unitarily with flywheel assembly (220). As mentioned above, and as will be described in greater detail below, scanning assembly (100) is operable to track to rotational displacement and/or position of flywheel assembly (220) as flywheel assembly (220) rotates around longitudinal axis (LA) and send this rotational displacement and/or position to computer (10).

FIG. 10B shows flywheel assembly (220) rotated such that first outward beam (390) reflects off target (40). Therefore, target (40) reflects a first reflected beam (394) back toward flywheel assembly (220) toward the optical block assembly (300) through which first outward beam (390) passes. As will be described in greater detail below, optical block assembly (300) is configured to further reflect first reflected beam (392) into a second reflected beam (396) and a directed beam (398). As will also be described in greater detail below, optical block assembly (300) includes a light detector (370) configured to detect directed beam (398). Light detector (370) is also in communication with computer (10). Once light detector (370) of the first optical block assembly (300) associated with first outward beam (390) detects direct beam (398), light detector (370) communicates the detection to computer (10), which then stores a first corresponding timing data, rotational displacement, and/or position of flywheel assembly (220) about longitudinal axis (LA).

Next, as shown in FIG. 10C, flywheel assembly (220) further rotates such that second outward beam (392) reflects off target (40) back toward the optical block assembly (300) through which second outward beam (392) passes. As will be described in greater detail below, this optical block assembly (300) is configured to further reflect first reflected beam (394) into second reflected beam (396) and directed beam (398). As will also be described in greater detail below, optical block assembly (300) includes light detector (370) configured to detect directed beam (398). Once light detector (370) of the second optical block assembly (300) associated with second outward beam (392) detects direct beam (398), light detector (370) communicates the detection to computer (10), which then stores a second corresponding timing data, rotational displacement, and/or position of flywheel assembly (220) about longitudinal axis (LA). Computer (10) may then utilize the known distance between output beams (390, 392) and the angular locations of flywheel assembly (220) when the respective optical block assemblies (300) detected directed beams (398) to calculate the distance and angular location of target (40) relative to scanning assembly (100).

Scanning assembly (100) may repeat this process for each target (40) properly positioned on frame (25) so that computer (10) plots out the detected locations of all targets (40). Scanning assembly (100) may iteratively scan targets (40) as described above in order to track the changes in target (40) position while an operator bends frame (25) into a desired shape. Computer (10) may compare the actual location of targets (40) to predetermined positions of each target (40) associated with the proper shape of a specific frame (25) model. Therefore, measuring system (50) may help ensure an operator correctly modifies frame (25) into its desired shape.

Computer (10) may comprise a processor and memory encoded with programming information executable to implement the various algorithms described herein, as well as data that represents original and/or optimal positions for various points on frame (25) for various vehicles. It should therefore be understood that measuring system (50) may be implemented with a multitude of frame models.

II. Exemplary Rotational Displacement Measuring Assembly

While scanning assembly (100) is activated, errors may occur that may lead to inaccurate computations of target (40) positions. As described above, the angular location of flywheel assembly (220) is used by computer (10) to calculate and plot the location of detected targets (40). In some existing systems, the angular displacement of flywheel assembly (220) when a target is detected is calculated under the assumption the flywheel assembly (220) is rotated by drive assembly (210) at a constant angular velocity. In such an implementation, computer (10) would calculate the position of a target (40) using the angular displacement of flywheel assembly (220) at the moment when first optical block assembly (300) associated with first outward beam (390) detects directed beam (398) and at the moment when second optical block assembly (300) associated with second outward beam (392) detects directed beam (398) utilizing the assumed constant angular velocity. However, due to a variety of factors, drive assembly (210) may not consistently rotate flywheel assembly (220) at a constant angular velocity. As such, an error may occur in calculating the precise angular position of flywheel assembly (220) at either or both of those moments, which may introduce error into the calculations of computer (10) and its plots of the location of targets (40).

FIGS. 11-16C show an exemplary rotational displacement measuring assembly (250) that may be used to more accurately measure the rotational displacement and/or position of flywheel base (230) rotating around longitudinal axis (LA). Rotational displacement measuring assembly (250) includes a static wheel (252), a code wheel (254) having a plurality of radially extending code markings (256) positioned annularly around a face of code wheel (254), and an encoder assembly (260). Code wheel (254) is fixed to the underside of static wheel (252). Flywheel base (230) defines a keyhole recess (232) having a keyed portion (234). Code wheel (254) and static wheel (252) are housed within keyhole recess (232). Static wheel (252) and code wheel (254) are rotationally fixed relative to cylindrical base (212) of drive assembly (210) such that static wheel (252) and code wheel (254) do not rotate about longitudinal axis (LA) when motor (223) is activated, as described above. Each individual code marking (256) is presented radially at regular rotational positions around code wheel (254). Code wheel (254) may have any suitable number of code markings (256) that would be apparent to one having ordinary skill in the art in view of the teachings herein. Code markings (256) may be evenly distributed around the bottom face of code wheel (254) to circumferentially encompass the bottom face of code wheel (254), however this is merely optional. For example, code wheel (254) may have 3000 code markings (256) in an annular array around code wheel (254).

Encoder assembly (260) is housed within keyed portion (234) of flywheel base (230). Encoder assembly (260) includes a circuit board (262), an optical encoder (264) defining an aperture (265), a communication port (266), and mounting holes (268). Encoder assembly (260) is fixed to flywheel base (230) via mounting members (269) and mounting holes (268) such that encoder assembly (260) rotates around longitudinal axis (LA) when motor assembly (216) is activated, as described above. Encoder assembly (260) is fixed to flywheel base (230) at a location such that encoder assembly (260) is directly adjacent to code markings (256). In particular, optical encoder (264) and aperture (265) are directly adjacent to code markings (256). Encoder assembly (260) is also positioned such that optical encoder (254) and aperture (265) are directly adjacent to code markings (256) regardless of the rotational position of flywheel base (230). In other words, as encoder assembly (260) rotates around longitudinal axis (LA), optical encoder (254) is capable of detecting code markings (256) when aperture (265) is directly underneath code markings (256) and converting the sequence of code markings (256) into an electrical and/or binary signal as will be discussed in more detail below. Therefore, as a code marking (256) passes directly over aperture (265), optical encoder (254) may detect the code marking (256) and use the timing between detection of adjacent code markings (256) to improve the accuracy with which the precise positions of targets (40) are measured. Since optical encoder (264) is fixed to flywheel base (230), this may indicate the rotational position and/or displacement of flywheel base (230) as well. Therefore, as optical encoder (264) rotates about longitudinal axis (LA) between adjacent code markings (256), as shown between FIGS. 16A-16B, optical encoder (264) may read signals indicating flywheel base (230) has rotated a known angular displacement.

Optical encoder (264) is in communication with communication port (266) via circuit board (262). Communication port (266) may connect to computer (10) by any suitable means known to a person having ordinary skill in the art in view of the teachings herein, such as wired or wireless data communication. Therefore, optical encoder (264) may communicate with computer (10) the rotational position of flywheel base (230) at the moment it detects respective directed beams (398) based on reading of code markings (256) of code wheel (254) by optical encoder (264).

Figure 16A:
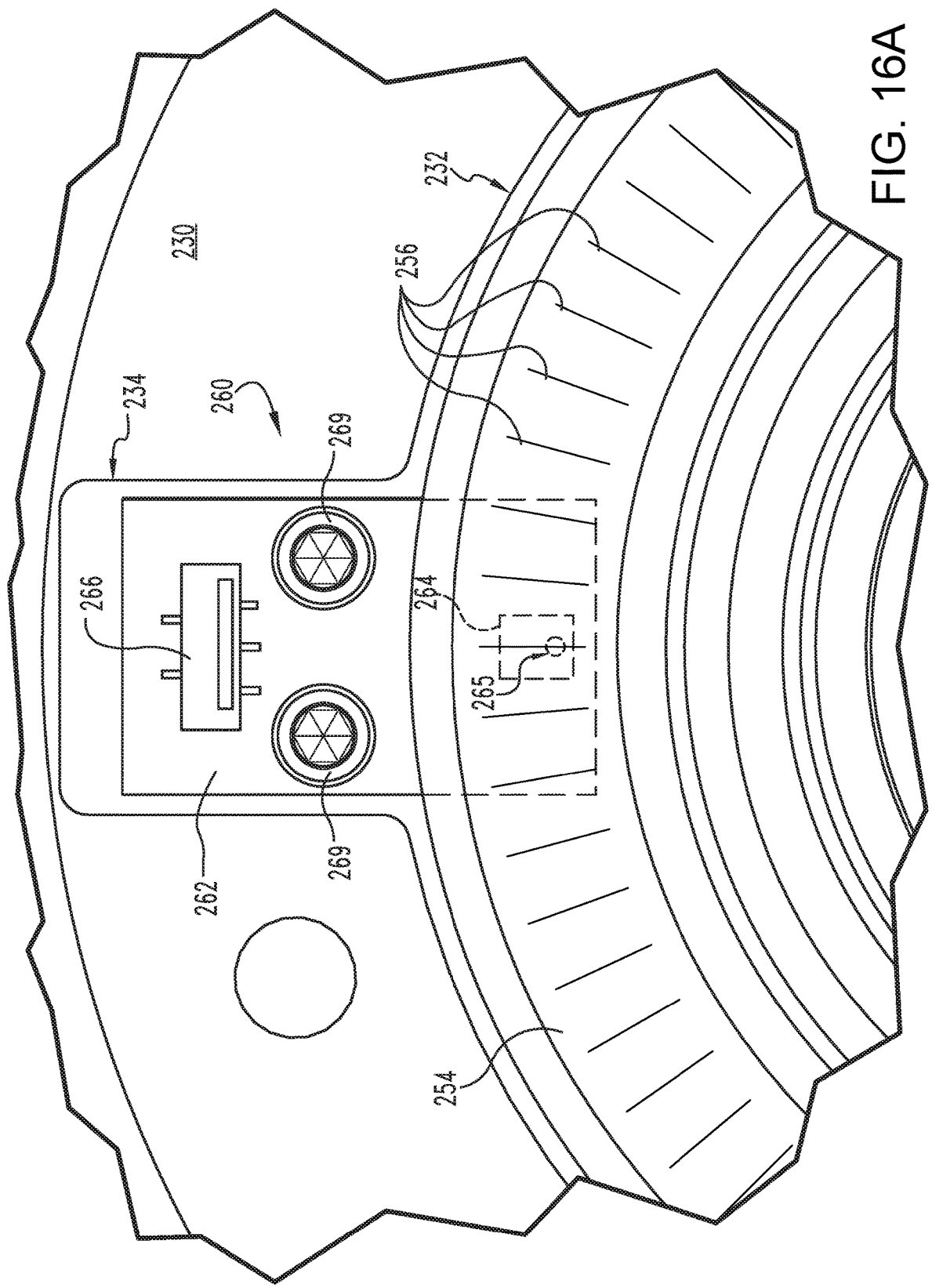
FIG. 16A is a cross-sectional plan view of the flywheel assembly of FIG. 7, where the flywheel assembly is in a first rotational position, taken along line 15-15 of FIG. 8 and within circle 16 of FIG. 15.
Figure 16B:
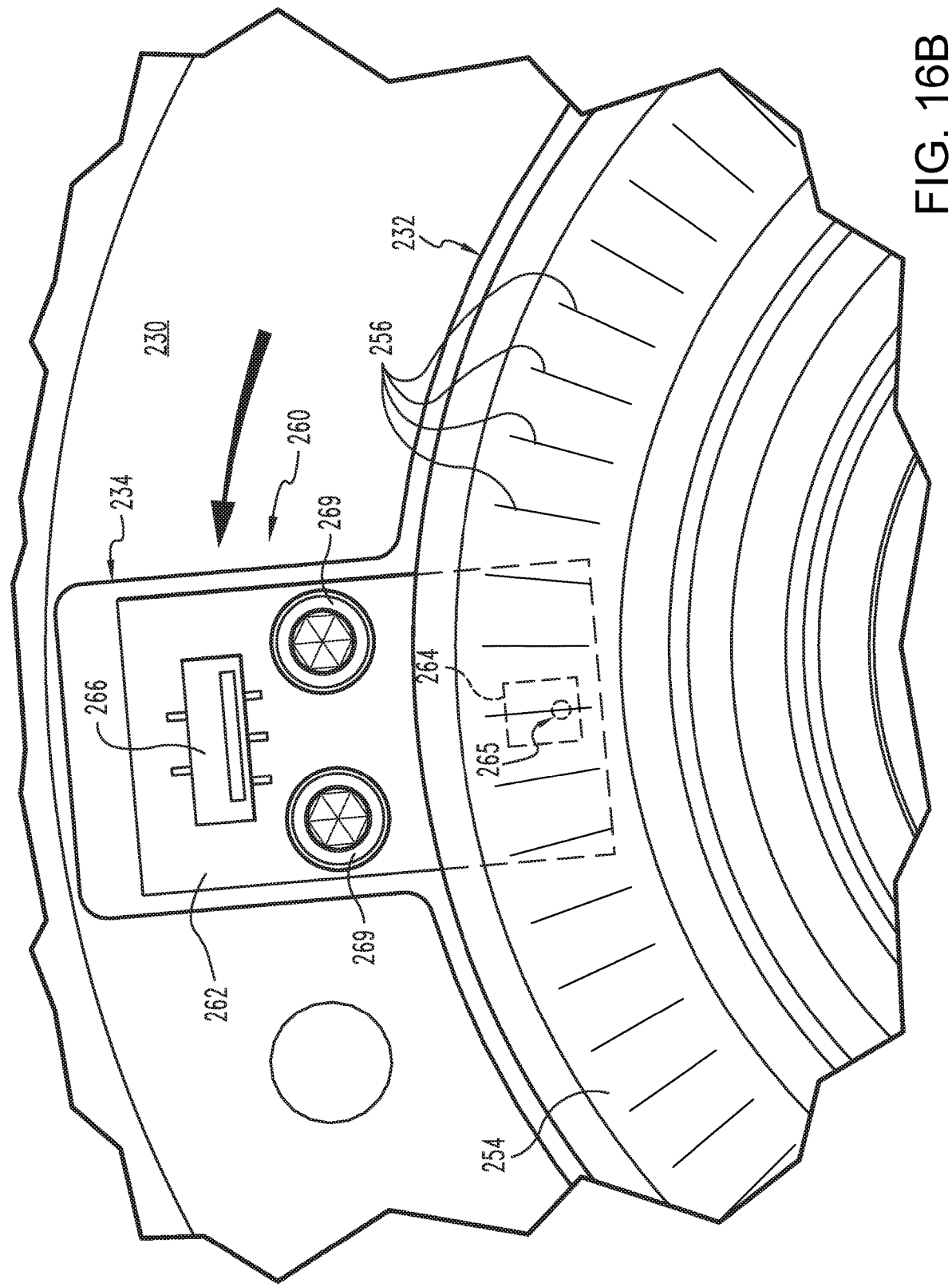
FIG. 16B is a cross-sectional plan view of the flywheel assembly of FIG. 7, where the flywheel assembly is in a second rotational position, taken along line 15-15 of FIG. 8 and within circle 16 of FIG. 15.
Figure 16C:
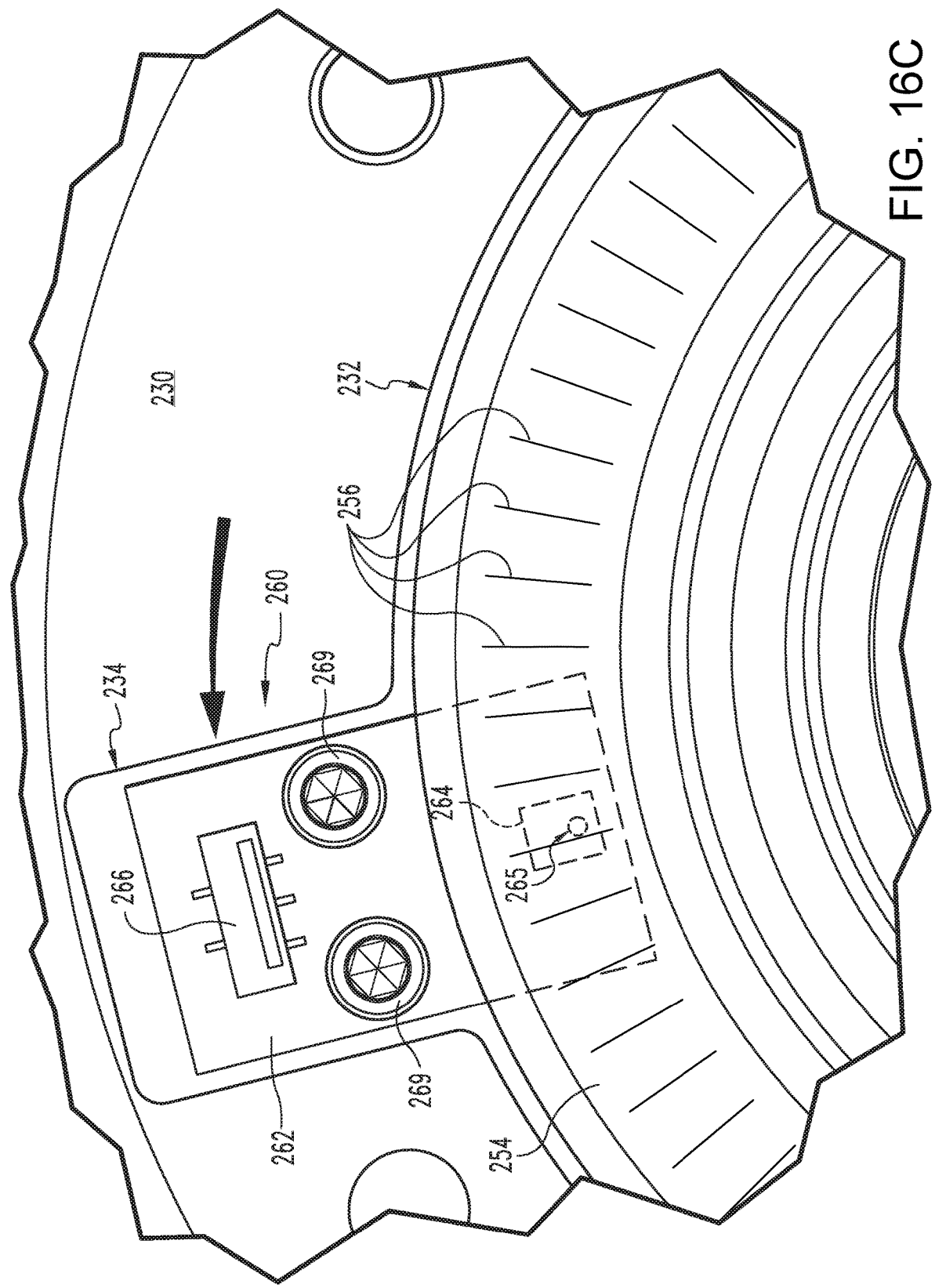
FIG. 16C is a cross-sectional plan view of the flywheel assembly of FIG. 7, where the flywheel assembly is in a third rotational position, taken along line 15-15 of FIG. 8 and within circle 16 of FIG. 15.
Figure 17:
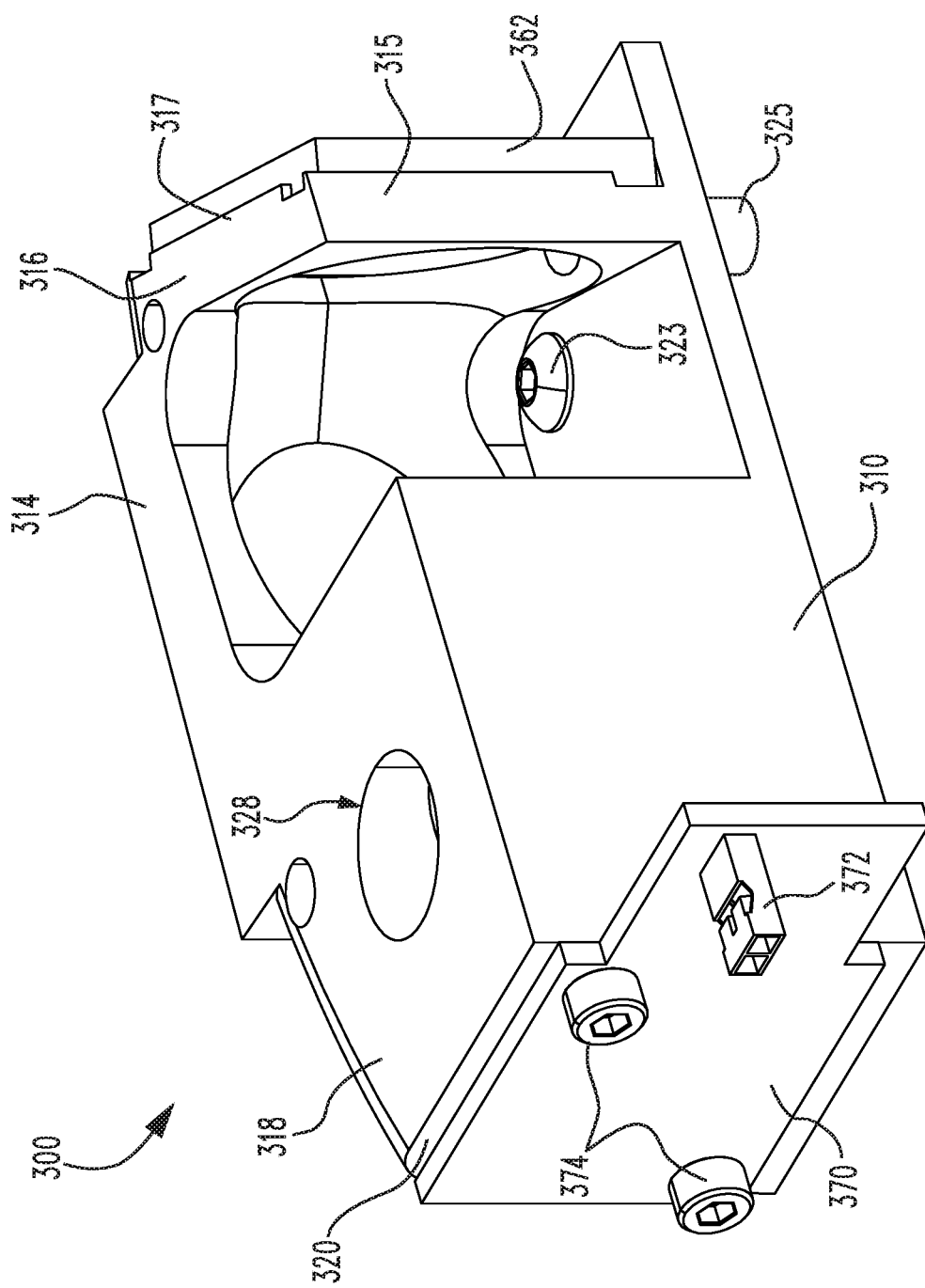
FIG. 17 is a perspective view of an optical block assembly of the flywheel assembly of FIG. 7.
Figure 18:
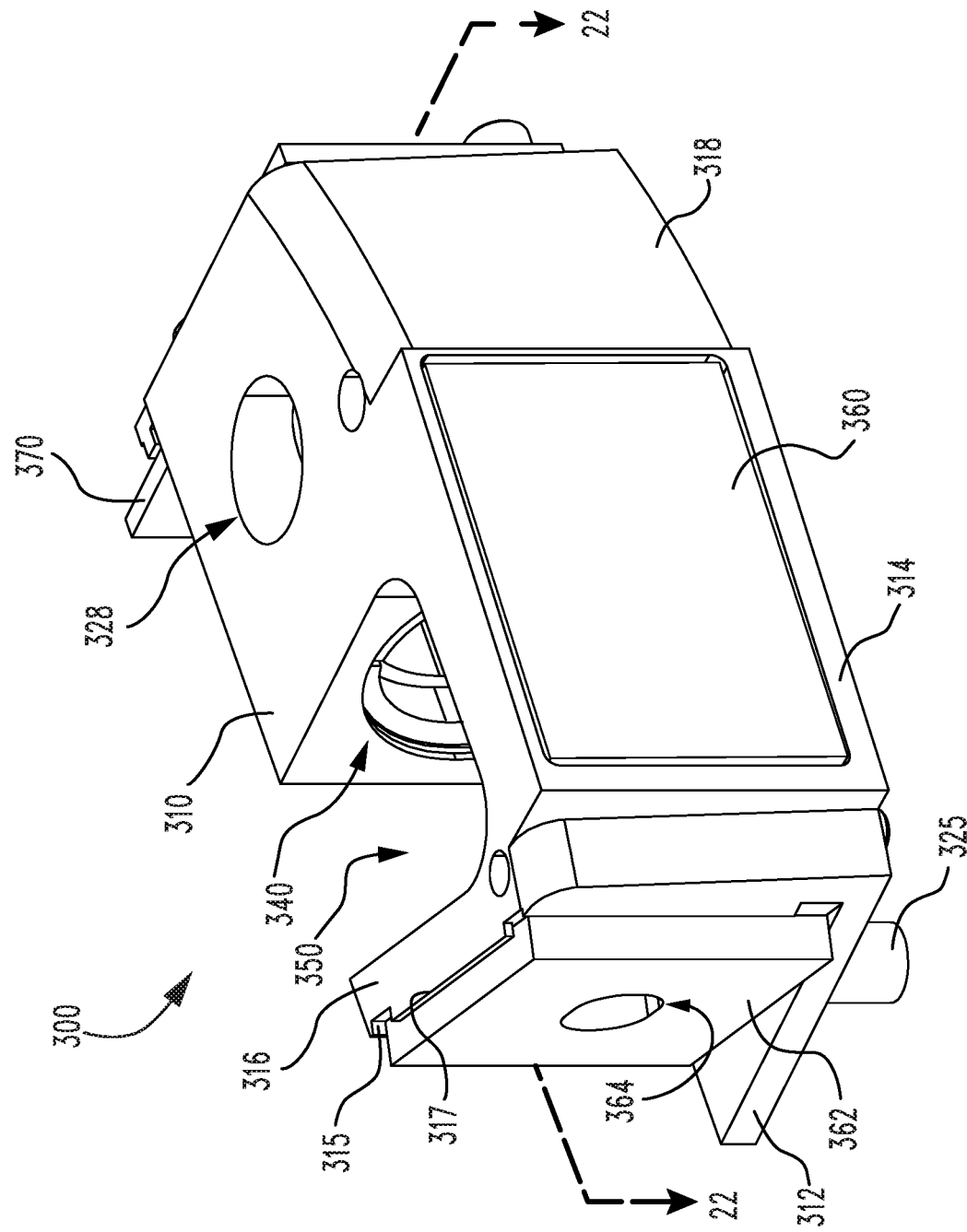
FIG. 18 is another perspective view of the optical block assembly of FIG. 17.
Figure 19:
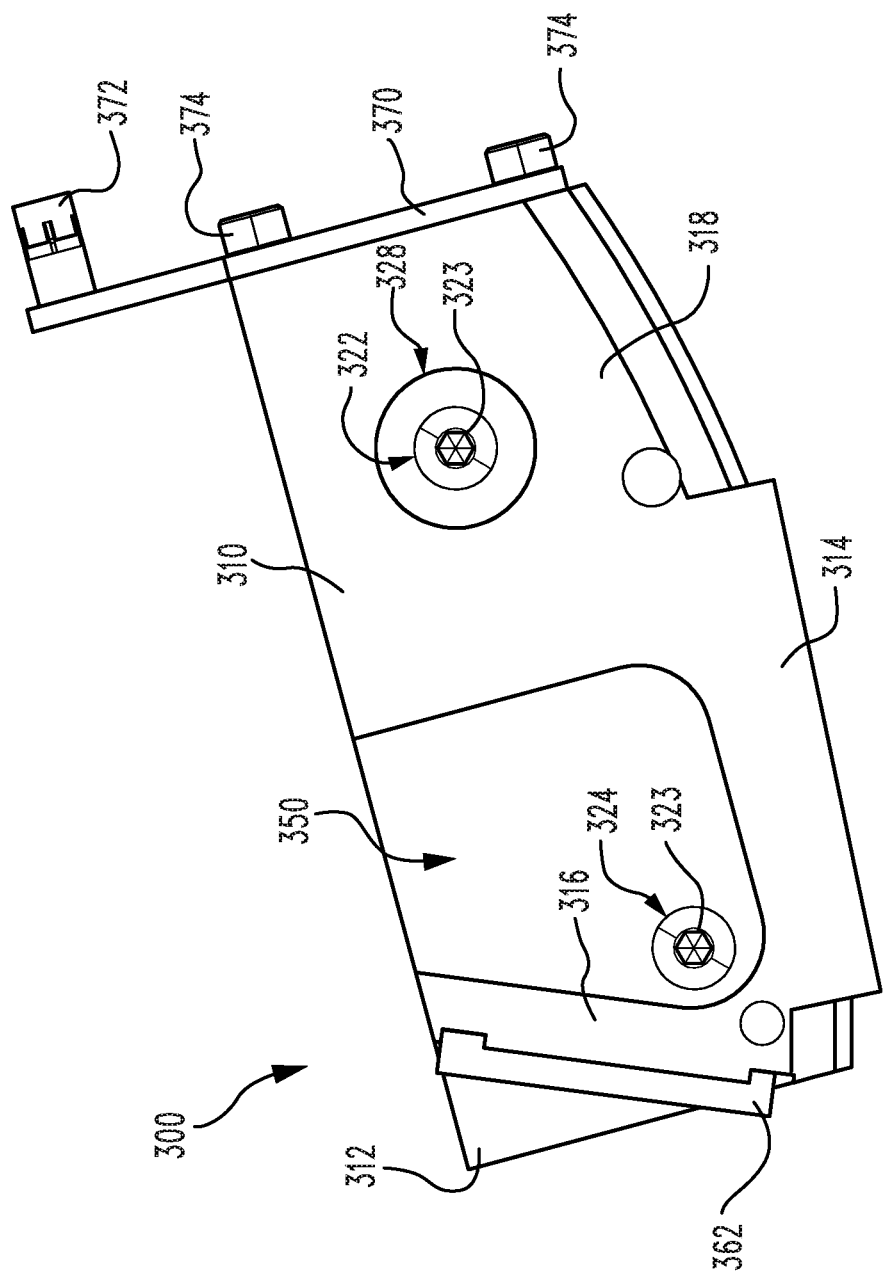
FIG. 19 is a top plan view of the optical block assembly of FIG. 17.
Figure 20:
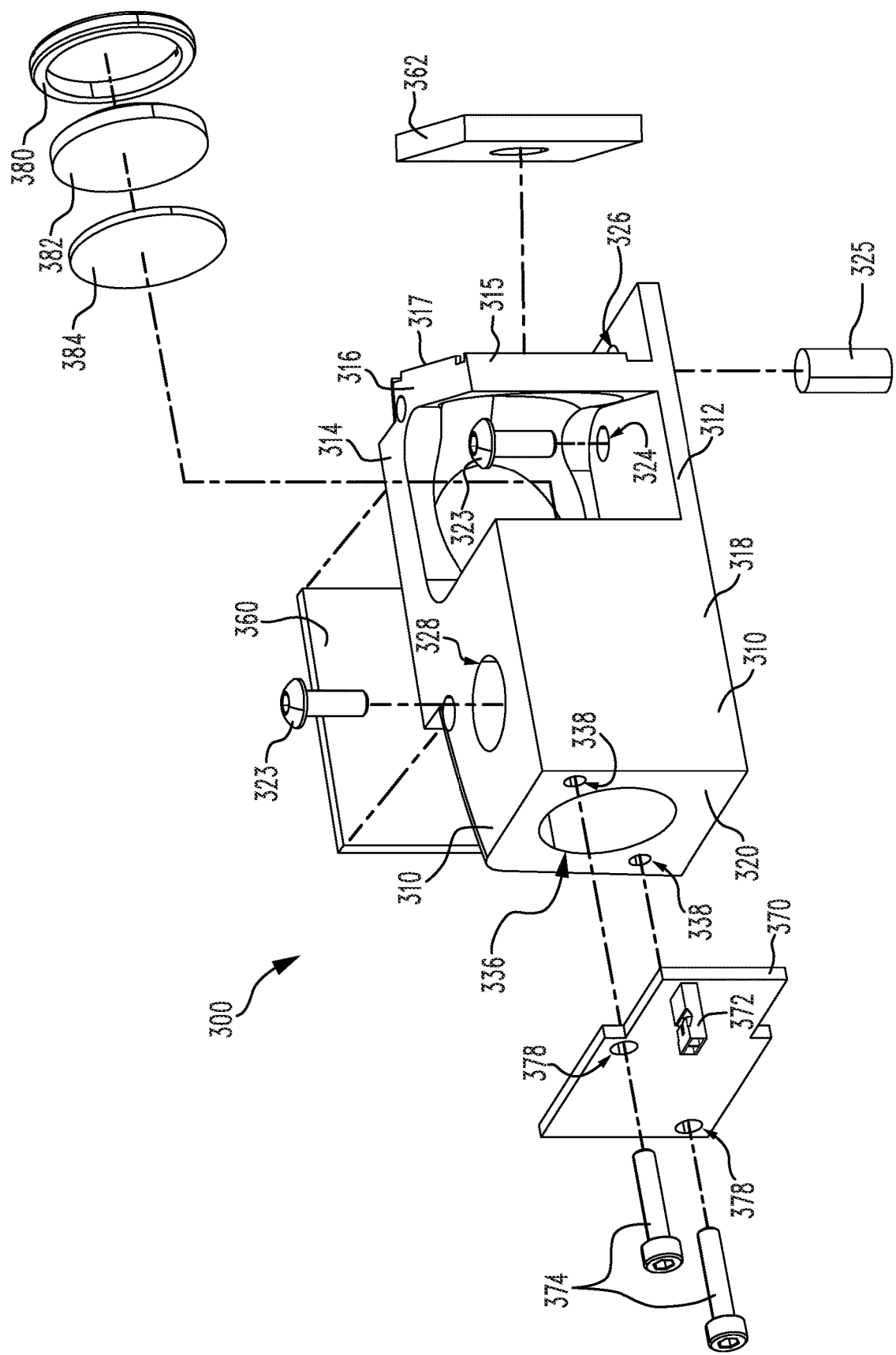
FIG. 20 is an exploded perspective view of the optical block assembly of FIG. 17.
Figure 21:
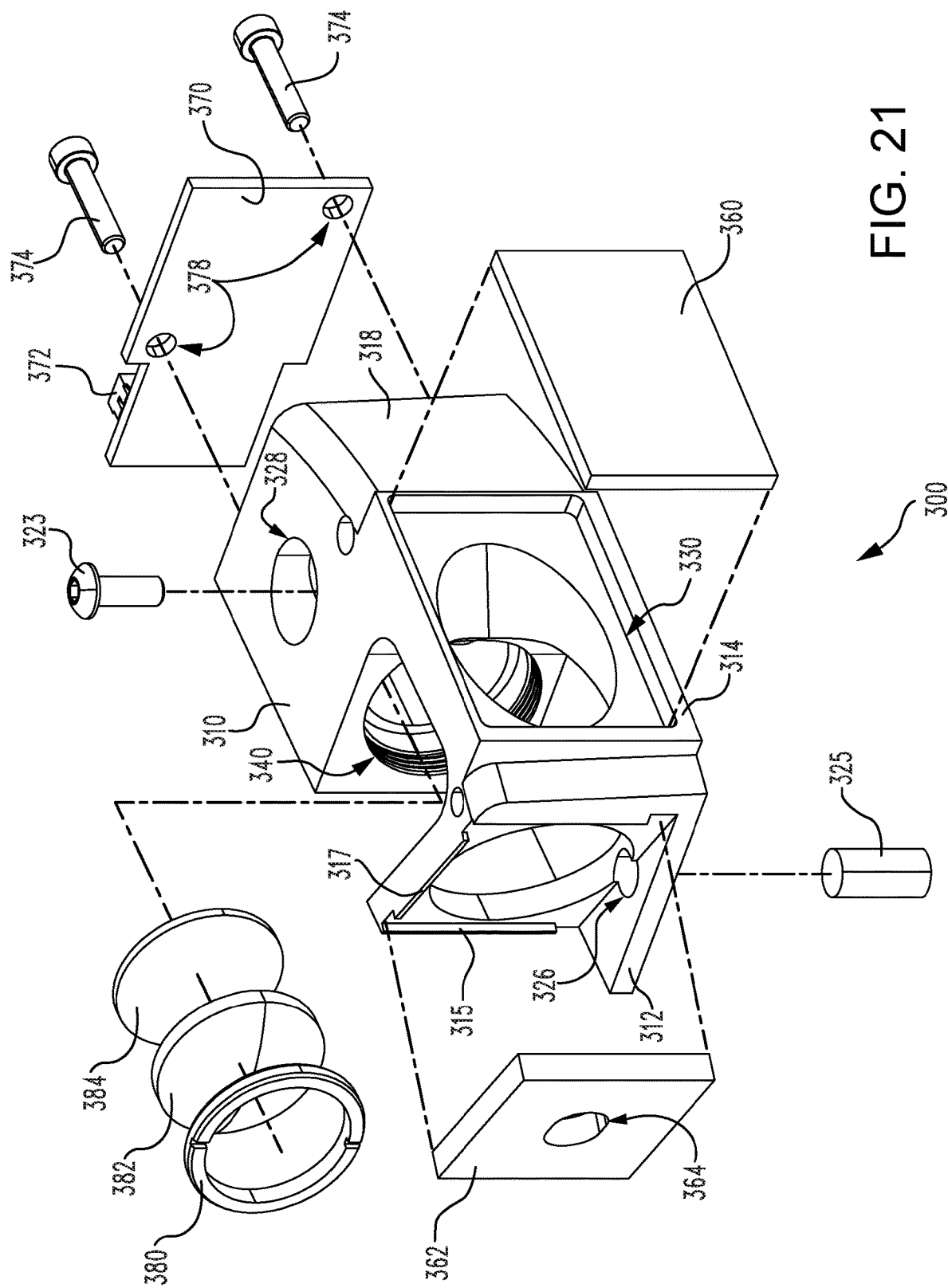
FIG. 21 is another exploded perspective view of the optical block assembly of FIG. 17.

Computer (10) may utilize the signal output from optical encoder (264) as input to a phase-locked loop to determine the rotational displacement between optical encoder (264) readings, as shown in FIG. 16C. For example, computer (10) may measure the time between optical encoder (264) readings of directly adjacent code markings (256) on previous rotations of flywheel base (230). Computer (10) may calculate an average rotational velocity of flywheel base (230) through the time it took optical on encoder (264) to read each adjacent code marking (256). Therefore, if optical block assembly (300) detects a directed beam (398) between optical encoder (264) readings of code markings (256), computer (10) may interpolate the sub-interval angular displacement of flywheel base (230) (between code markings (256)) utilizing the output of the phase-locked loop.

While in the current example, rotational displacement measuring assembly (250) utilizes a code wheel (254) and an optical encoder (264) to measure displacement of flywheel base (230), other implementations may use any other suitable angular measuring technique as would occur to one having ordinary skill in the art in view of the teachings herein. Additionally, while optical encoder (264) is fixed relative to flywheel base (230) and code wheel (254) is fixed relative to static wheel (252), this is merely optional. For example, optical encoder (264) may be fixed to static wheel (252) and code wheel (254) may be fixed to flywheel base (230).

III. Exemplary Multi-Level Detection of Reflected Beam

In some operational scenarios, as a light detector (370) begins to receive a directed beam (398) associated with reflection by a target (40), measuring system (50) cannot know what the overall magnitude of the portion of directed beam (398) associated with reflection by the target (40) will be. Even at a particular installation, variations in the distance between scanning assembly (100) and frame assembly (25) from one vehicle to the next, and proportionally significant differences between targets (40) attached to a particular frame assembly (25) can yield substantial differences in signal magnitude.

Figure 30:
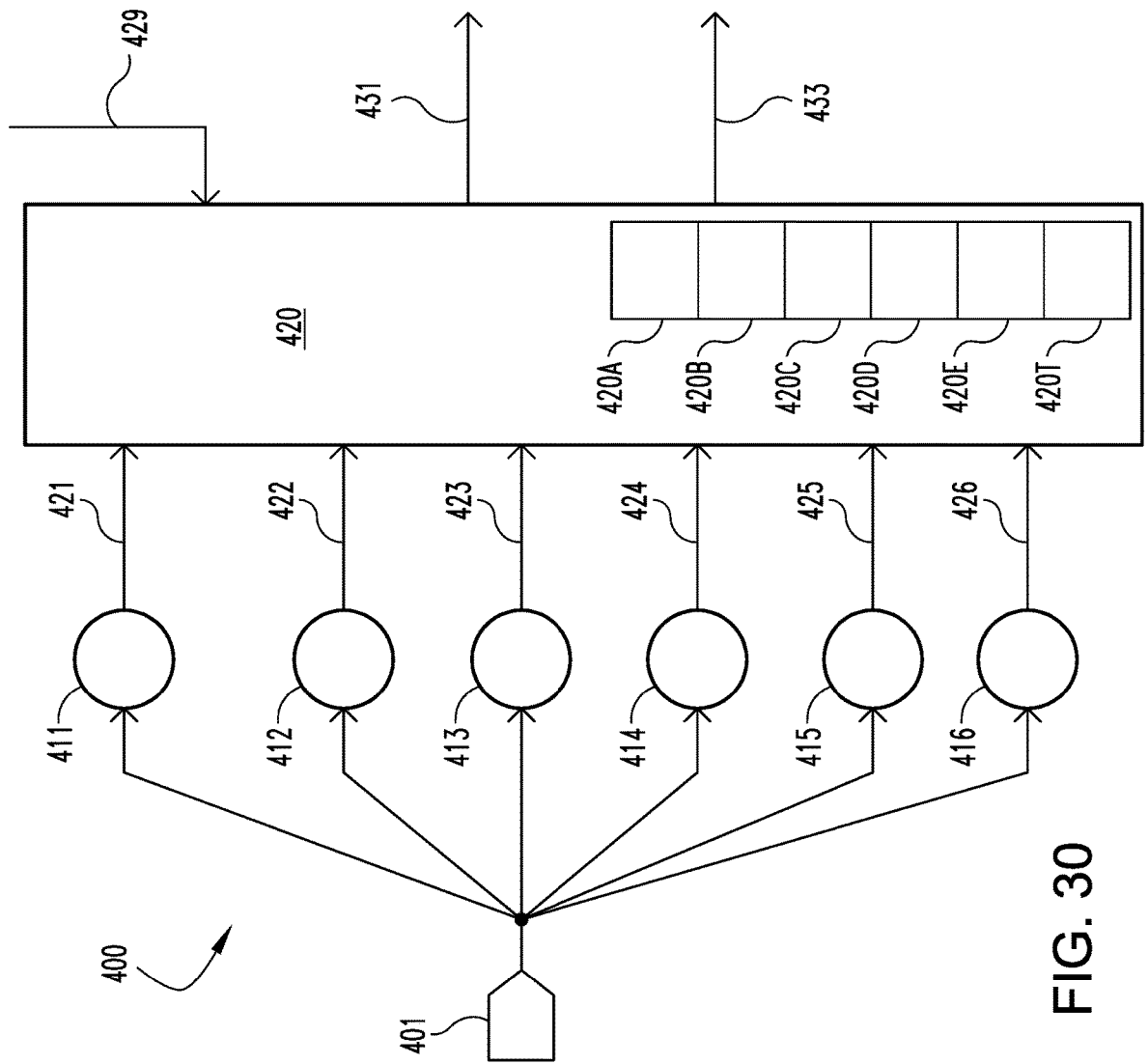
FIG. 30 is a schematic diagram of the target detection system for use with the scanning assembly of FIG. 2A.

One solution for this technical problem is illustrated in FIG. 30. Analog reflection signal (401) output by one of the light detectors (370) is split and sent to a plurality of (here, six) comparators (411, 412, 413, 414, 415, 416), each of which has a different threshold. In the illustrated embodiment, each threshold is twice the threshold of the previous one (e.g., 100 mV, 200 mV, 400 mV, 800 mV, 1600 mV, and 3200 mV), but the scaling will be different in other implementations as will occur to those skilled in the art in view this disclosure.

Each comparator (411, 412, 413, 414, 415, 416) generates a corresponding binary comparator output (421, 422, 423, 424, 425, 426) indicating whether analog reflection signal (401) exceeds or does not exceed the threshold of that comparator (411, 412, 413, 414, 415, 416). Field-programmable gate array (FPGA) (420) accepts binary comparator outputs (421, 422, 423, 424, 425, 426) and timing signal (429), implementing state machine (430) illustrated in FIG. 28 to produce time outputs (431, 433) as discussed just below. Alternative implementations of state machine (430), such as in discrete components, in one or more programmable controllers, or in functionally equivalent analog circuitry will occur to those skilled in the art in view of this disclosure.

State machine (430) begins in base state (S0). At the leading edge (P1L) of comparator output (421) of comparator (411), FPGA (420) saves the current timestamp into register (420A) and moves to state (S1.1). If the next received transition signal is the leading edge (P2L) of comparator output (422) of comparator (412), FPGA (420) saves the current timestamp into register (420B) and moves to state (S2.2). Alternatively, if the next received transition signal is the trailing edge of comparator output (421) of comparator (411), FPGA (420) returns to base state (S0).

In this illustrated embodiment, from state (S2.2), if the next received transition signal is the leading edge (P3L) of comparator output (423) of comparator (413), FPGA (420) saves the current timestamp into register (420C) and moves to state (S3.3). Alternatively, if the next received transition signal is the trailing edge of comparator output (422) of comparator (412), FPGA (420) moves to state (S1.2). From state (S1.2), if the next received transition signal is another leading edge (P3L) of comparator output (423) of comparator (413), FPGA (420) moves back to state (S2.2). If, on the other hand, while in state (S1.2), FPGA (420) receives a trailing edge (P1T) of comparator output (421) of comparator (411), FPGA (420) saves the current time into register (420T), outputs the contents of registers (420A, 420T) via outputs (431, 433), and returns to base state (S0).

From state (S3.3), if the next transition FPGA (420) receives is a leading edge (P4L) of comparator output (424) of comparator (414), FPGA (420) saves the current timestamp into register (420D) and moves to state (S4.4). On the other hand, if FPGA (420) receives a trailing edge (P3T) of comparator output (423) of comparator (413), FPGA (420) moves to state (S2.3). From state (S2.3), if the next transition FPGA (420) receives is another leading edge of comparator output (423) of comparator (413), FPGA (420) moves back to state (S3.3). On the other hand, if from state (S2.3) FPGA (420) receives a trailing edge (P2T) of comparator output (422) of comparator (412), FPGA (420) saves the current time into register (420T), outputs the contents of registers (420B, 420T) via outputs (431, 433), and moves to state (S1.3). From state (S1.3), if analog reflection signal (401) continues to fall, so the next transition received is a trailing edge of comparator output (421) of comparator (411), FPGA (420) simply returns to base state (S0). On the other hand, if FPGA (420) is in state (S1.3) and receives another leading edge (P2L) of comparator output (422) of comparator (412), FPGA (420) again saves the current timestamp into register (420B) and moves to state (S2.2).

From state (S4.4), if the next transition FPGA (420) receives is a leading edge (P5L) of comparator output (425) of comparator (415), FPGA (420) saves the current timestamp into register (420E) and moves to state (S5.5). On the other hand, if FPGA (420) is in state (S4.4) and receives a trailing edge (P4T) of comparator output (424) of comparator (414), FPGA (420) moves to state (S3.4). From state (S3.4), if the next transition FPGA (420) receives is another leading edge of comparator output (424) of comparator (414), FPGA (420) moves back to state (S4.4). On the other hand, if from state (S3.4) FPGA (420) receives a trailing edge (P3T) of comparator output (423) of comparator (413), FPGA (420) saves the current time into register (420T), outputs the contents of registers (420C, 420T) via outputs (431, 433), and moves to state (S2.4). From state (S2.4), if analog reflection signal (401) continues to fall, so the next transition received is a trailing edge of comparator output (422) of comparator (412), FPGA (420) simply moves to state (S1.3). On the other hand, if FPGA (420) is in state (S2.4) and receives another leading edge (P3L) of comparator output (423) of comparator (413), FPGA (420) again saves the current timestamp into register (420C) and moves to state (S3.3).

From state (S5.5), if the next transition FPGA (420) receives is a leading edge of comparator output (426) of comparator (416), FPGA (420) moves to state (S6.6). On the other hand, if FPGA (420) is in the state (S5.5) and receives a trailing edge (P5T) of comparator output (425) of comparator (415), FPGA (420) moves to state (S4.5). From state (S4.5), if the next transition FPGA (420) receives is another leading edge of comparator output (425) of comparator (415), FPGA (420) moves back to state (S5.5). On the other hand, if from state (S4.5) FPGA (420) receives a trailing edge (P4T) of comparator output (424) of comparator (414), FPGA (420) saves the current time into register (420T), outputs the contents of registers (420D, 420T) via outputs (431, 433), and moves to state (S3.5). From state (S3.5), if analog reflection signal (401) continues to fall, so the next transition received is a trailing edge of comparator output (423) of comparator (413), FPGA (420) moves to state (S2.4). On the other hand, if FPGA (420) is in state (S3.5) and receives another leading edge (P4L) of comparator output (424) of comparator (414), FPGA (420) again saves the current timestamp into register (420D) and moves to state (S4.4).

From state (S6.6), the next transition FPGA (420) receives must be a trailing edge of comparator output (426) of comparator (416), and upon receiving it, FPGA (420) moves to state (S5.6). If another leading edge of comparator output (426) of comparator (416) is then received, FPGA (420) moves back to state (S6.6). On the other hand, if FPGA (420) is in state (S5.6) and receives a trailing edge of comparator output (425) of comparator (415), FPGA (420) saves the current time into register (420T), outputs the contents of registers (420E, 420T) via outputs (431, 433), and moves to state (S4.6). From state (S4.6), if analog reflection signal (401) continues to fall, so the next transition received is a trailing edge of comparator output (424) of comparator (414), FPGA (420) moves to state (S3.5). On the other hand, if FPGA (420) is in state (S4.6) and receives another leading edge (P5L) of comparator output (425) of comparator (415), FPGA (420) again saves the current timestamp into register (420E) and moves to state (S5.5).

As will be appreciated by those having ordinary skill in the art, the logic described above and shown in FIG. 28 avoids producing output triggered only by oscillations of analog reflection signal (401) around the detection threshold of any single comparator (411, 412, 413, 414, 415, 416). While this result may be desirable in some implementations, other implementations will use different logic to achieve different qualitative results as will occur to those skilled in the art in view of this disclosure.

Figure 28:
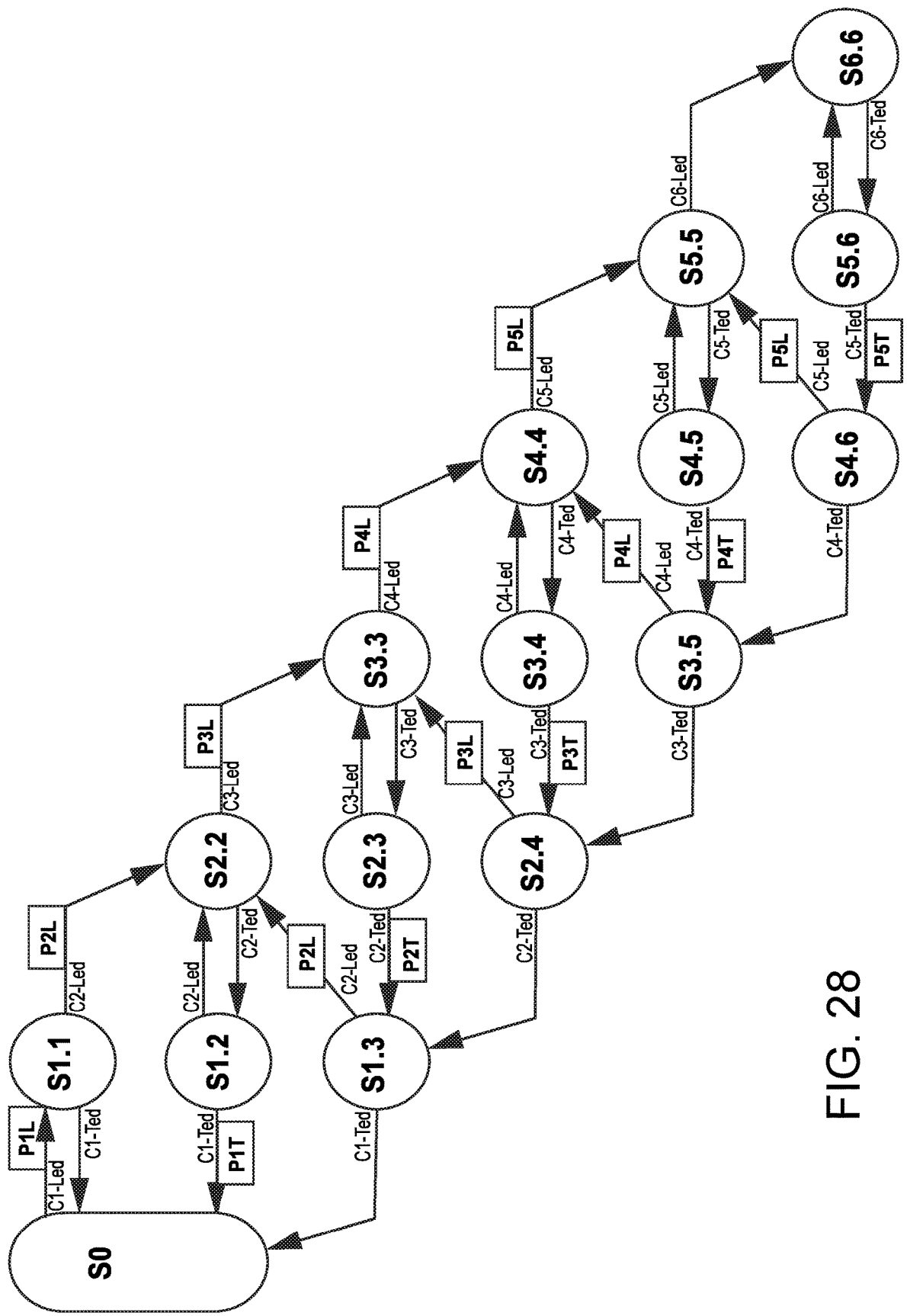
FIG. 28 is a flowchart for a state machine for the exemplary target detection system of FIG. 30.
Figure 29A:
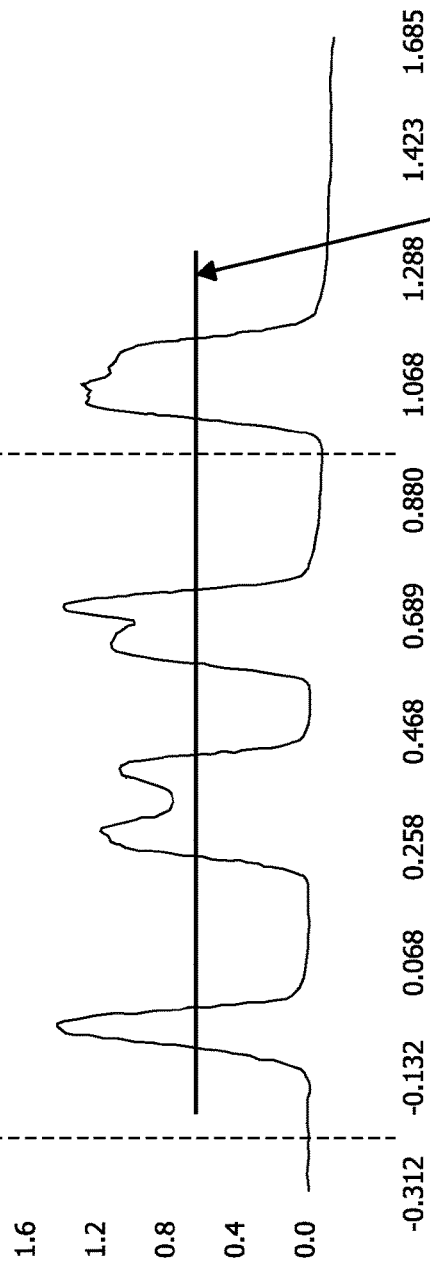
FIGS. 29A and 29B are waveforms of target returns processed by the exemplary target detection system of FIG. 30.
Figure 29B:
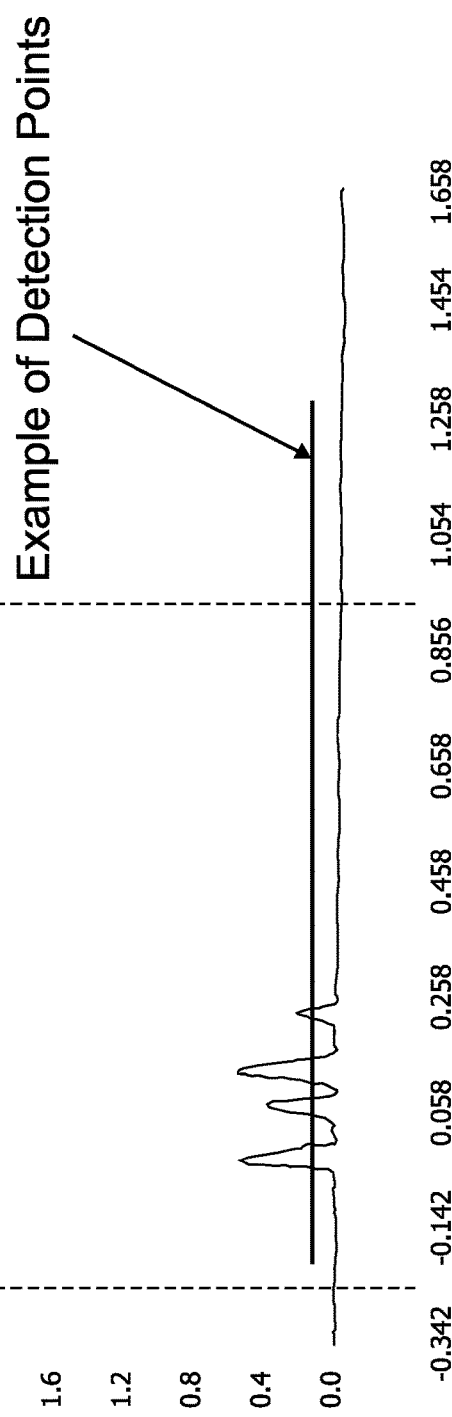

As the skilled artisan will also appreciate, the detection subsystem shown in FIGS. 28-30 detects the timing of peaks in analog reflection signal (401) corresponding to reflections from targets (40) over a wide range of signal magnitudes (as one would find when the distances between scanning assembly (100) and various targets (40) vary substantially). FIGS. 29A, 29B provide example waveforms of different magnitudes and illustrate the thresholds corresponding to the detection points for rising and falling edges of those peaks. Of course, other implementations will have different numbers of comparators, different comparator thresholds and distributions of comparator thresholds, different state logic, different input/output paradigms, and different data storage techniques as will occur to those skilled in the art in view of this disclosure.

IV Exemplary Optical Block Assembly

As mentioned above, laser assembly (270) and pentaprism assemblies (240) are attached to flywheel base (230)

to produce two output beams (390, 392). Each output beam (390, 392) is configured to extend through a respective optical block assembly (300) and reflect off targets (40) back into their respective optical block assembly (300) for detection. As will be described in greater detail below, optical block assembly (300) may further reflect beams from targets (40) to direct the beam to light detector (370). Therefore, components of optical block assembly (300) must be precisely assembled relative to flywheel base (230) and relative to other components of optical block assembly (300) to properly receive output beams (390) as well as reflected beams (394). When components of optical block assembly (300) are assembled relative to each other out of alignment, a multitude of measuring errors may occur.

FIGS. 17-23 show an exemplary optical block assembly (300) that addresses this risk. Optical block assembly (300) includes a monolithic block (310), a sheet of protective glass (360), a mirror (362), a light detector (370), a threaded retaining ring (380), a convex lens (382), and a filter (384). Monolithic block (310) is configured to attach to flywheel base (230) while all other components are configured to attach to monolithic block (310). Monolithic block (310) is made out a single block of material, such that it requires no assembly. Therefore, as other components are attached to monolithic block (310), other components will be consistently placed in position relative to each other.

As best seen in FIGS. 24-27, monolithic block (310) includes a base (312), a protective glass extension (314), a mirror extension (316), and a lens assembly housing (318). Base (312) defines two mounting holes (322, 324) and a dowel rod hole (326). Mounting holes (322) are dimensioned to receive mounting screws (323) while dowel rod hole (324) is dimensioned to receive a precision dowel rod (325) in order to fix monolithic block (310) to flywheel base (330). Dowel rod (325) and dowel rod hole (326) may ensure that monolithic block (310) is precisely located and oriented relative to flywheel base (330) while mounting holes (322, 324) and mounting screws (323) may ensure monolithic block (310) is fixed to flywheel base (330) and properly oriented.

Figure 23:
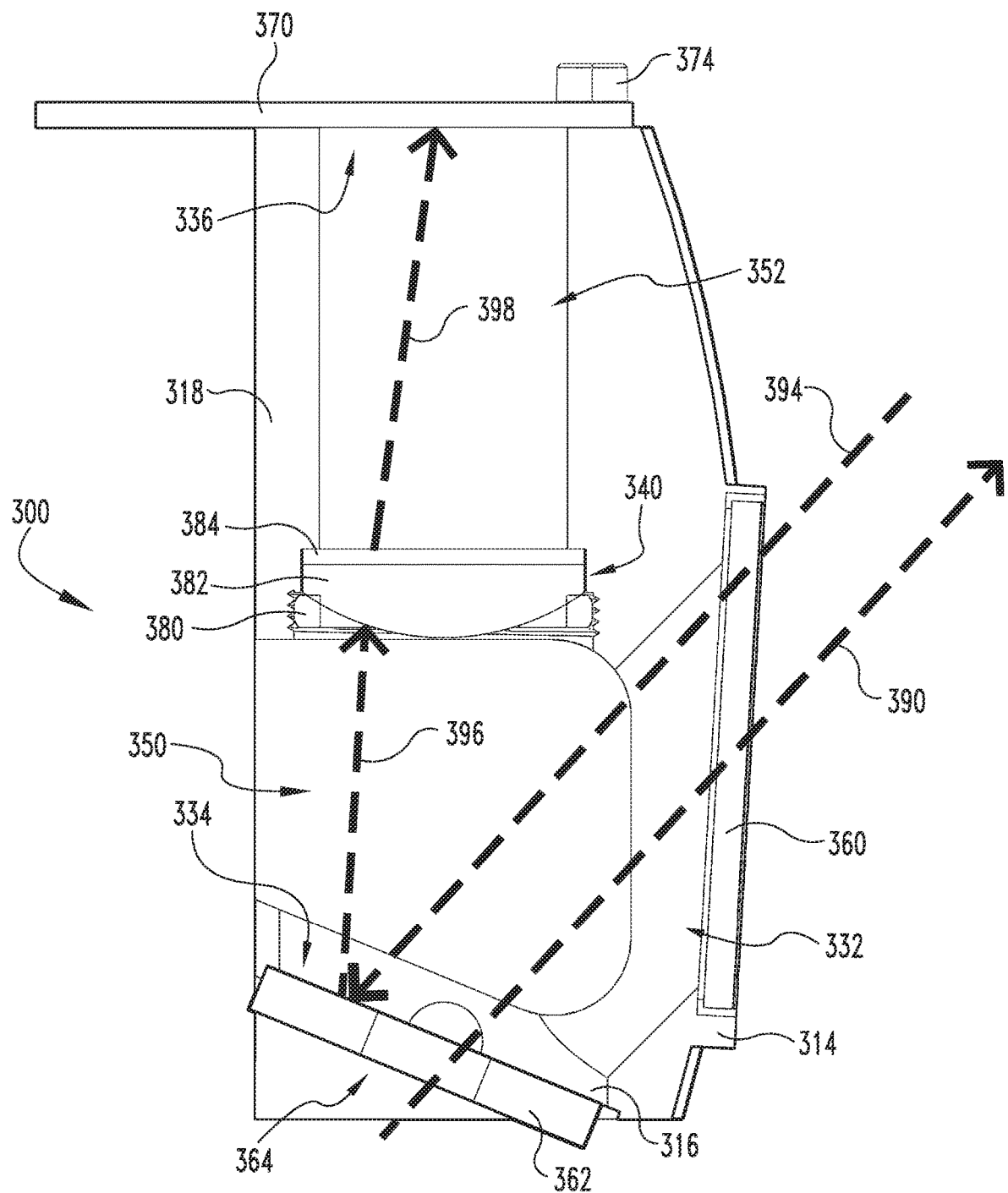
FIG. 23 is a cross-sectional top view of the optical block assembly of FIG. 17, where a laser has been reflected off a coded reflective target of FIG. 1 and back into the optical block assembly as illustrated in FIG. 10C.
Figure 24:
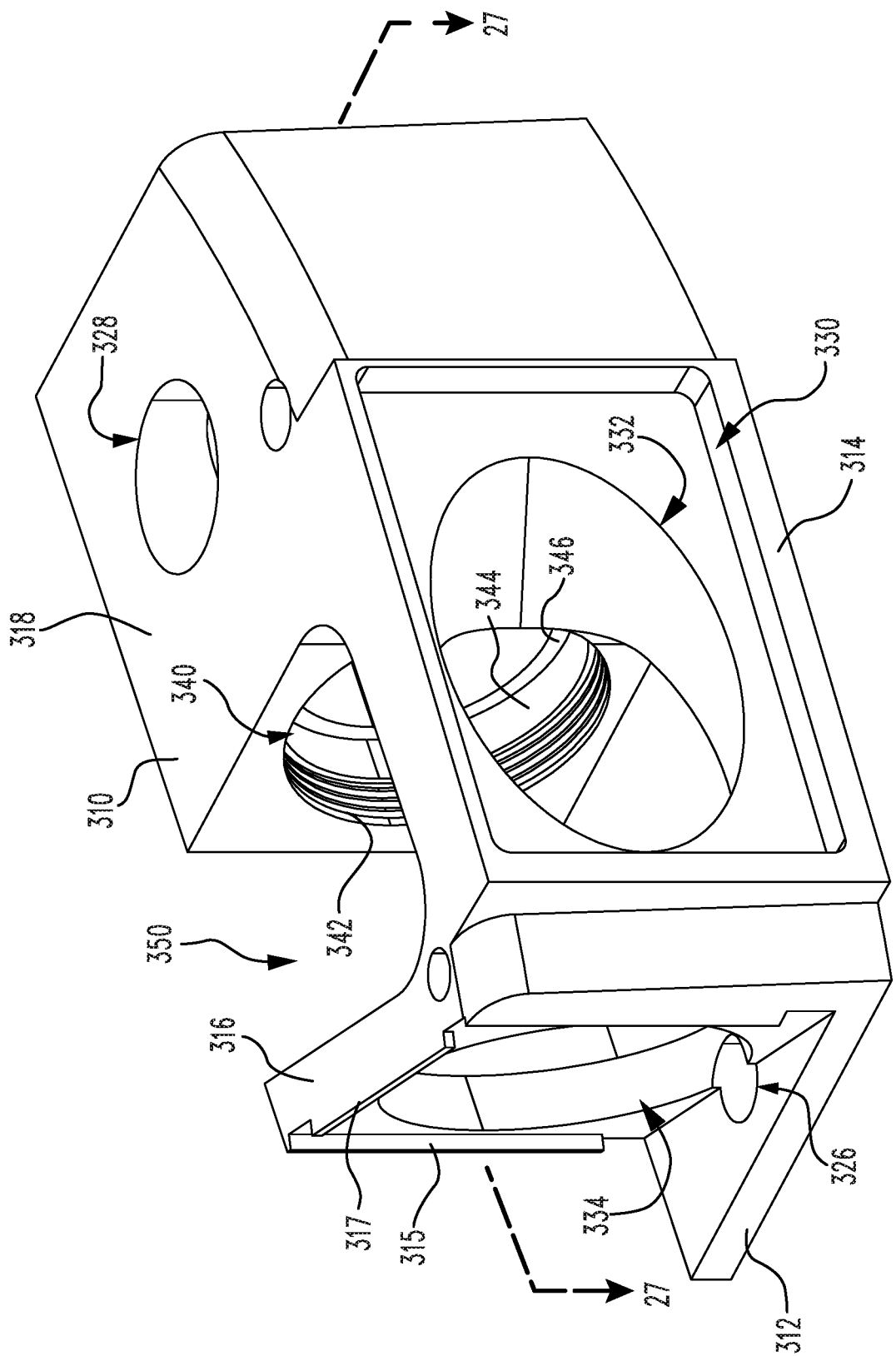
FIG. 24 is a perspective view of a single-piece block of the optical block assembly of FIG. 17.
Figure 25:
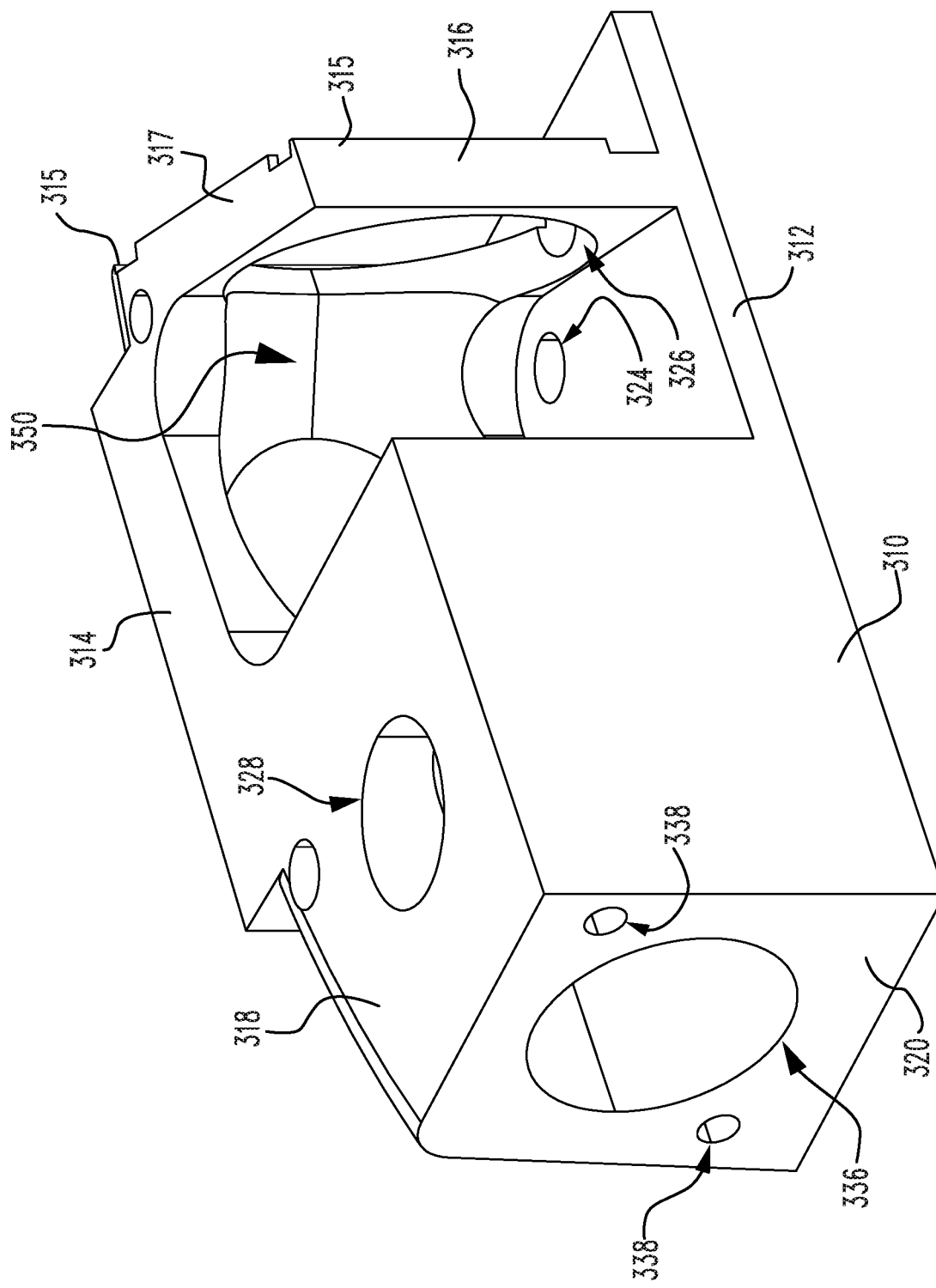
FIG. 25 is another perspective view of the single-piece block of FIG. 24.
Figure 26:
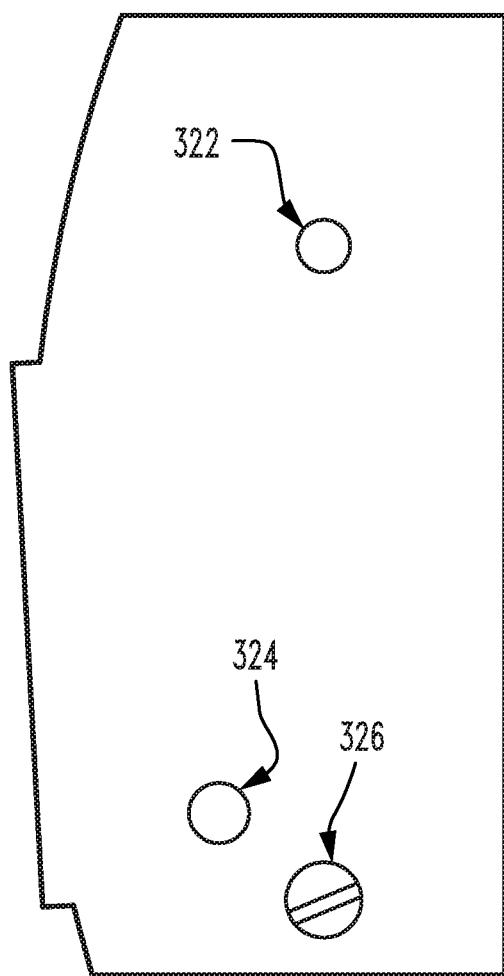
FIG. 26 is a bottom plan view of the single-piece block of FIG. 24.
Figure 27:
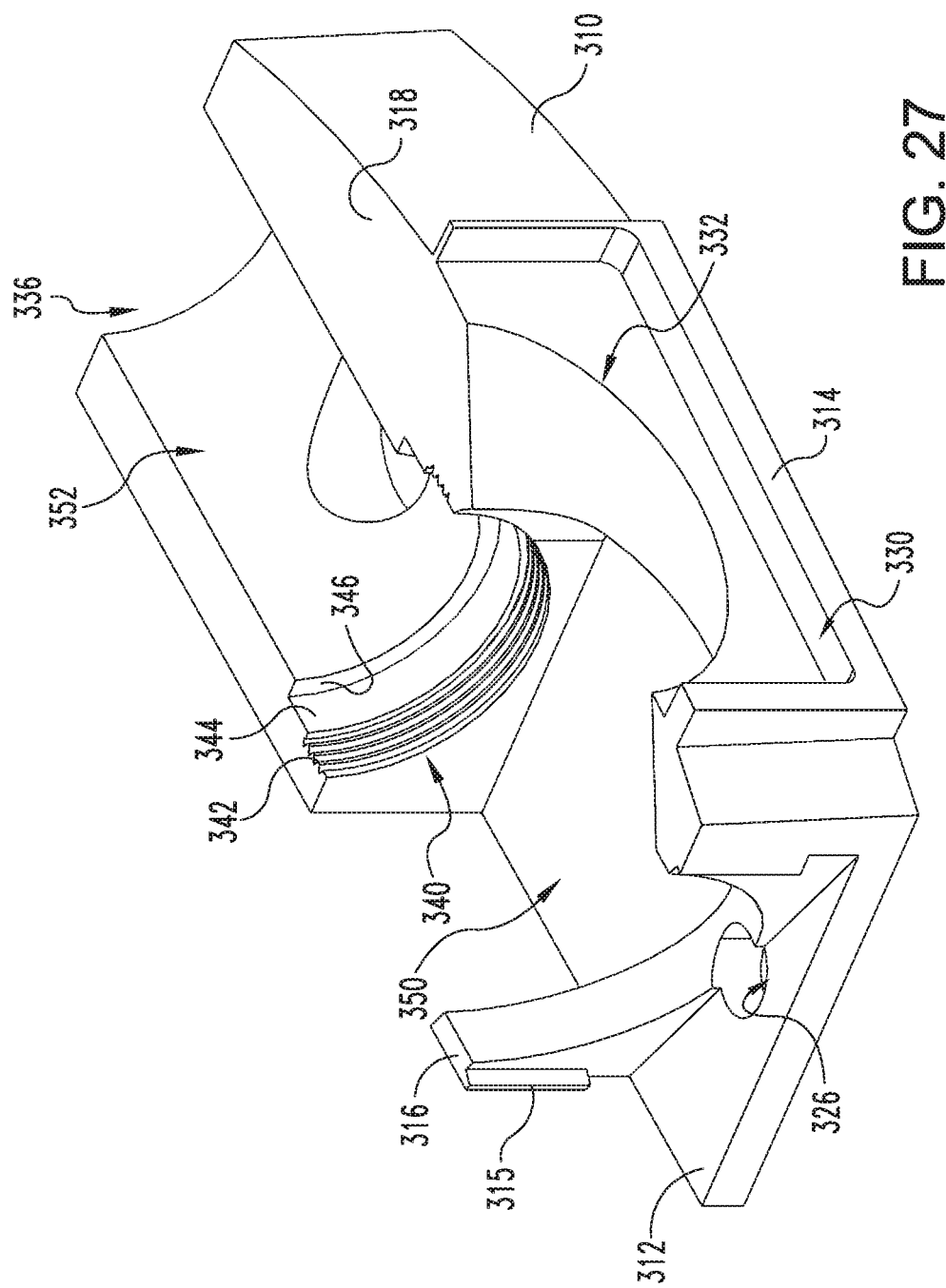
FIG. 27 is a cross-sectional perspective view of the single-piece block of FIG. 24, taken along line 27-27 of FIG. 24.

Protective glass extension (314) is configured to receive and couple with protective glass (360). Protective glass (360) may help protect components of optical block assembly (300) located within the confines of monolithic block (310). Protective glass extension (314) defines a recess (330) and an aperture (332). Recess (330) is configured for an interference fit with protective glass (360). While in the current example, protective glass (360) mates with protective glass extension (314) via an interference fit, any other suitable means of connecting protective glass (360) with protective glass extension (314) may be used as would be apparent to one having ordinary skill in the art in view of the teachings herein. For example, a snap fitting or adhesives may be used. As best seen in FIG. 23, aperture (332) is configured to receive first outward beam (390) (or, analogously, second outward beam (392)) and to receive first reflected beam (394) from a target (40). Because protective glass extension (314) is a component of monolithic block (310), protective glass (360) may be consistently attached relative to other components of optical block assembly (300).

Mirror extension (316) is configured to receive and couple with mirror (362). Mirror extension (316) includes flanges (315, 317) which may encompass and house mirror (362). Mirror extension (316) also defines aperture (334). When installed, dowel rod (325) may extend through dowel hole (326) to abut mirror (362) against flange (317) in order to fix mirror (362) within mirror extension (316). Mirror (362) defines an aperture (364). As best seen in FIG. 23, mirror (362) and mirror extension (316) are located such that apertures (334, 364) may receive either first or second outward beam (390, 392) and such that an interior portion of mirror may reflect first reflected beam (394) to a second reflected beam (396). Second reflected beam (396) is directed toward lens (382). Because mirror extension (316) is a component of monolithic block (310), mirror (362) may be consistently attached relative to other components of optical block assembly (300).

Lens assembly housing (318) includes a mount face (320). Mount face (320) defines coupling holes (338) configured to receive mounting screws (374). Mount face (320) may couple with light detector (370) via coupling holes (338, 378) and mounting screws (374). Lens assembly housing (318) defines aperture (336) so that a properly assembled light detector (370) may detect light from within a second light path (352) defined by lens assembly housing (318). Because lens assembly housing (318) is a component of monolithic block (310), light detector (370) may be attached in a consistent position and orientation relative to other components of optical block assembly (300).

Light detector (370) includes communication port (372), which is configured to provide communication between light detector (370) and computer (310). Light detector (370) is operable to detect light within second light path (352) and communicate that detection of light to computer (310). As will be described in greater detail below, light detector (370) may detect light from reflective targets (40). Light detector (370) may comprise any suitable material and components that would be apparent to one having ordinary skill in the art in view of the teachings herein. For example, light detector (370) may comprise a photodiode sensor and detector printed circuit board. Computer (310) may use this detection for purposes of calculating and plotting the locations of targets (40) relative to scanning assembly (100).

Figure 22:
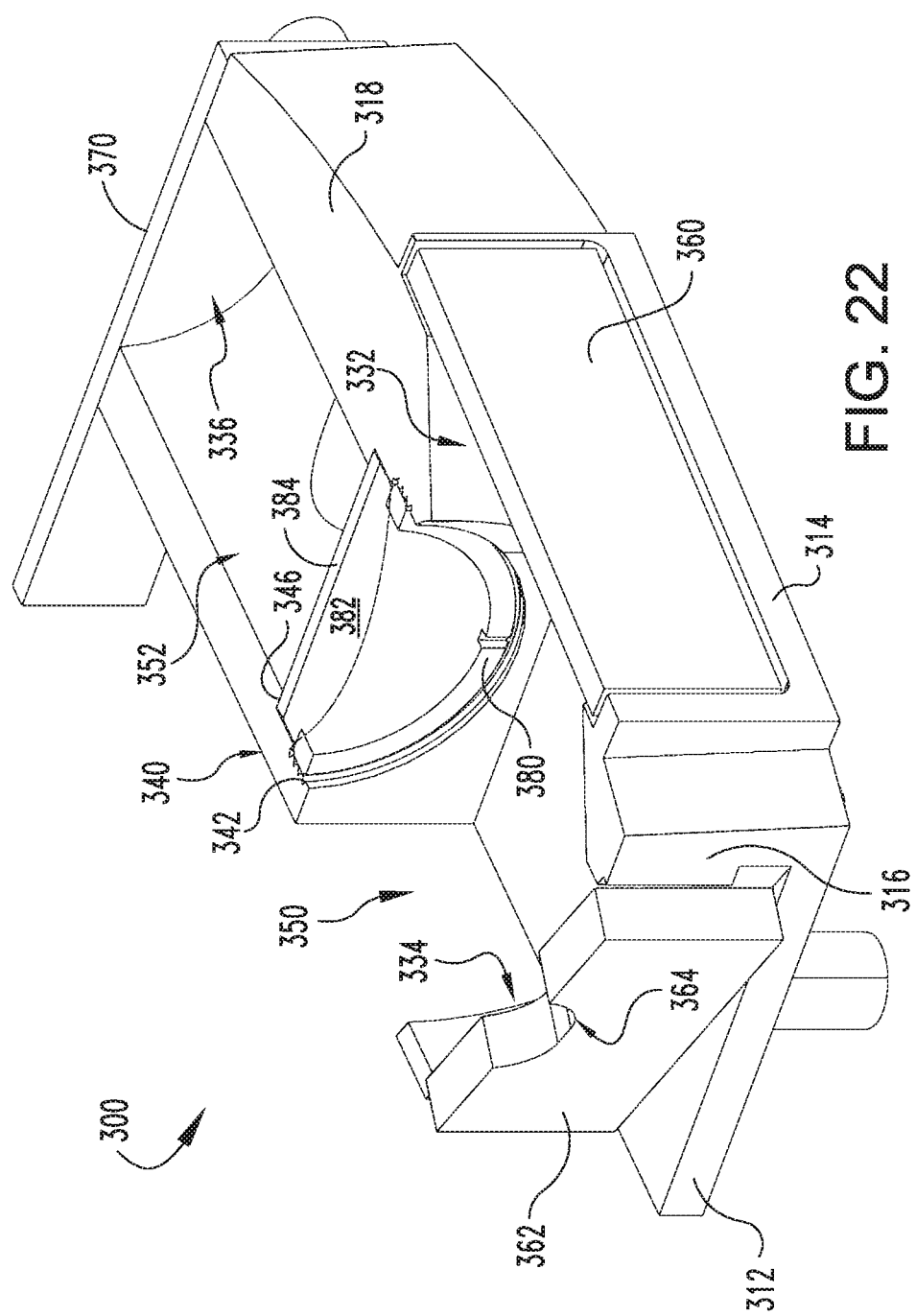
FIG. 22 is a cross-sectional perspective view of the optical block assembly of FIG. 17, taken along line 22-22 of FIG. 18.

Lens assembly housing (318) also defines a through hole (328) for receiving mounting screw (323), and an aperture (340) for housing threaded retaining ring (380), lens (382), and filter (384). Aperture (340) is further defined by threading (342), housing portion (344), and an annular stop (346). As best seen in FIG. 22, filter (384) may abut against annular stop (346), while lens (382) abuts against filter (384) when assembled. Threaded retaining ring (380) may couple with threading (342) of aperture (340) such that threaded retaining ring (380) keeps lens (382) and filter (384) retained in position. Because lens assembly housing (318) is a component of monolithic block (310), light detector (370), lens (382), and filter (384) may be attached with consistent position and orientation relative to other components of optical block assembly (300).

With all components of optical block assembly (300) properly attached and aligned, FIG. 23 shows an exemplary detection by optical block assembly (300) of a reflected beam (394) received from target (40). When assembled, first or second outward beam (390, 392) may enter through apertures (334, 364) defined by mirror extension (316) and mirror (362), respectively, into first light path (350) defined by protective glass extension (314), mirror extension (316), and lens assembly housing (318). First or second outward beam (390, 392) may exit through aperture (332) and protective glass (360). Once outward beam (390, 392) reflects off target (40), target (40) may direct first reflected beam (394) back through protective glass (360) and aperture (332). The interior portion of mirror (362) may deflect first reflected beam (394) and direct a second reflected beam (396) within first light path (350) toward lens (382). Lens (382) may focus first reflected beam (394) through filter (384) into directed beam (398) within second light path (352) toward a location on light detector (370). Filter (382) may help ensure only light from first reflected beam (394) enters into second light path (352) by blocking ambient light sources. Light detector (370) may register the detection of directed beam (398) and communicate that detection to computer (10). Computer (10) may then compute and store the rotational placement of flywheel base (230) associated at the point in time at which light detector (370) detects second reflected beam (396).

Because all components of optical block assembly (300) are attached to monolithic block (310), the timing of detection of the reflected beams described above may consistently and accurately be calculated by computer (10). This may help reduce measuring errors associated with improper assembly or misalignment of components in previous optical block assemblies.

V. Exemplary Ambient Temperature Calibration Device

As mentioned above, while scanning assembly (100) is activated, errors may occur which may lead to inaccurate computations of target (40) positions. As described above, the known distance between pentaprisms (242, 242') is used by computer (10) to calculate and plot the location of detected targets. Pentaprisms (242, 242') are fixed to flywheel base (230) via prism mounts (244). However, scanning assembly (100) may be used in a variety of locations, each having different ambient temperatures. For instance, scanning assembly (100) may be used in a shop with little heating available during winter months, while the same shop may have little cooling available during summer months. Therefore, even a single scanning assembly (100) may be used in a variety of ambient temperatures. Flywheel base (230) may be made of a material, such as steel, that may expand and/or contract because of changes in the ambient temperature. Expansion and contraction of flywheel base (230) may lead to variations in the distance between prism mounts (244), leading to variations in distance between pentaprisms (242, 242'). Variations in the distance between pentaprisms (242, 242') may lead to errors in the calculating and plotting by computer (10) of the location of targets (40).

As mentioned above, flywheel assembly (220) may include a temperature sensor (280) attached to flywheel base (230). Temperature sensor (280) may be in communication with computer (10) through any suitable methods that would be apparent to one having ordinary skill in the art in view of the teachings herein. Temperature sensor (280) is configured to measure temperature of the scanner and communicate that temperature to computer (10). Temperature sensor (280) may produce analog and/or digital output, and it may include any other suitable temperature measuring device that would be apparent to one having ordinary skill in the art in view of the teachings herein. For instance, a diode temperature sensor, a thermocouple, a thermometer, an infrared thermometer, a thermistor, or the like may be used in various implementations.

Computer (10) may use the scanner temperature in its calculations described herein to take into account the thermal expansion or contraction of the scanner material. Computer (10) may thereby adapt the calculations to use the appropriately adjusted distance between first and second output beams (390, 392) in calculating and plotting the distance and location of targets (40) relative to scanning assembly (100) and each other as described above. For instance, computer (10) may have a first, known, fixed distance between first and second output beams (390, 392) at a given temperature. Then, computer (10) may replace the fixed distance between first and second output beams (390, 392) in its calculations with a temperature-dependent model based on developed algorithms. Therefore, errors associated with change in ambient temperature may be reduced. While in the current example, temperature sensor (280) is attached to flywheel base (230), temperature sensor (280) may be attached to any suitable component of scanning assembly as would be apparent to one having ordinary skill in the art in view of the teachings herein. For instance, temperature sensor (280) may be attached to encoder assembly (260). In various embodiments, temperature sensor (280) may communicate with computer (10) via communication port (266).

VI. Miscellaneous

It should also be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:
1. A scanning apparatus comprising:
  (a) a base assembly;
  (b) a platform configured to rotate relative to the base assembly about an axis;
  (c) a beam-generating assembly attached to the platform and configured to rotate with the platform relative to the base assembly, wherein the beam-generating assembly is configured to generate at least one outward beam of light;
(d) a beam-detection assembly attached to the platform and configured to rotate with the platform relative to the base assembly, wherein the beam-detection assembly is configured to detect
  (i) a first reflected beam, and
  (ii) a second reflected beam;
(e) a temperature sensor assembly configured to generate a temperature sensor output signal; and
(f) a processor configured to
  (i) determine a timing metric in response to the beam-detection assembly detecting the first reflected beam and the second reflected beam,
  (ii) determine a first distance as a function of the temperature sensor output signal, and,
  (iii) determine a second distance as a function of both the timing metric and the first distance.

2. The scanning apparatus of claim 1, wherein the temperature sensor assembly comprises a diode temperature sensor.

3. The scanning apparatus of claim 1, wherein the temperature sensor assembly comprises an infrared thermometer.

4. The scanning apparatus of claim 1, wherein the temperature sensor assembly is attached to the platform.

5. The scanning apparatus of claim 1, wherein the platform comprises a flywheel.

6. The scanning apparatus of claim 1, wherein:
the at least one outward beam of light comprises a first outward beam and a second outward beam,
the first outward beam and the second outward beam are substantially parallel,
the first reflected beam is a reflection of the first outward beam,
the second reflected beam is a reflection of the second outward beam, and
the first distance represents a distance between the first outward beam and the second outward beam.

7. The scanning apparatus of claim 1, wherein the beam-generating assembly comprises:
a laser configured to generate an initial beam;
a first prism means configured to split the initial beam into a first outward beam of the at least one outward beam of light, and a split beam; and
a second prism means configured to redirect the split beam to become a second outward beam of the at least one outward beam of light.

8. The scanning apparatus of claim 7, wherein:
the first prism means comprises a first pentaprism, and
the second prism means comprises a second pentaprism.

9. The scanning apparatus of claim 1, wherein:
the beam-detection assembly comprises a first optical block assembly and a second optical block assembly,
the first optical block assembly is configured to detect the first reflected beam, and
the second optical block assembly is configured to detect the second reflected beam.

10. The scanning apparatus of claim 9, wherein:
the first optical block assembly is configured to receive a first outward beam of the at least one outward beam of light, and
the second optical block assembly is configured to receive a second outward beam of the at least one outward beam of light.

11. The scanning apparatus of claim 9, wherein:
the first optical block assembly comprises a first light detector, and
the second optical block assembly comprises a second light detector.

12. The scanning apparatus of claim 11, wherein:
the first optical block assembly comprises a mirror configured to redirect the first reflected beam toward the first light detector; and
the mirror is held in fixed spatial relationship with the first light detector by the first optical block assembly.

13. The scanning apparatus of claim 12, wherein:
the first optical block assembly comprises a lens configured to focus the first reflected beam toward the first light detector; and
the lens is held in fixed spatial relationship with the first light detector by the first optical block assembly.

14. The scanning apparatus of claim 13, wherein the first optical block assembly comprises a monolithic block configured to consistently spatially fix the lens and the mirror relative to each other.

15. The scanning apparatus of claim 1, further comprising a motor configured to rotate the platform relative to the base assembly.

16. A method of determining a distance between a first outward beam and a second outward beam of a scanning apparatus, the scanning apparatus comprising
a base assembly;
a beam-generating assembly configured to rotate relative to the base assembly about an axis, wherein the beam-generating assembly is configured to generate the first outward beam and the second outward beam; and
a temperature sensor configured to generate a signal that varies according to a detected temperature, wherein the distance between the first outward beam and the second outward beam is a function of the detected temperature,
the method comprising:
(a) receiving the signal generated by the temperature sensor, and
(b) using a processor to automatically calculate, as a function of the signal generated by the temperature sensor, a distance between the scanning apparatus and a target.

17. The method of claim 16, wherein the beam-generating assembly comprises:
a laser configured to generate an initial beam;
a first prism means configured to split the initial beam into the first outward beam and a split beam; and
a second prism means configured to redirect the split beam to become the second outward beam.

18. The method of claim 16, further comprising rotating the beam-generating assembly relative to the base assembly.

19. The method of claim 18, further comprising measuring the rotational displacement of the beam-generating assembly relative to the base assembly.

20. The method of claim 19, wherein measuring the rotational displacement further comprises using a code wheel and an optical encoder.

* * * * *